US011886211B2

(12) United States Patent
Lee et al.

(10) Patent No.: US 11,886,211 B2
(45) Date of Patent: *Jan. 30, 2024

(54) SOLAR TRACKING SYSTEM

(71) Applicant: ARRAY TECH, INC., Albuquerque, NM (US)

(72) Inventors: Kyumin Lee, Albuquerque, NM (US); Lucas Creasy, Scottsdale, AZ (US); Jon Sharp, Fort Collins, CO (US); Lars Tomasson, Albuquerque, NM (US); Sourav Gur, Kolkata (IN)

(73) Assignee: ARRAY TECH, INC., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,925

(22) Filed: Jun. 14, 2022

(65) Prior Publication Data
US 2022/0308600 A1   Sep. 29, 2022

Related U.S. Application Data

(63) Continuation of application No. 17/061,341, filed on Oct. 1, 2020, now Pat. No. 11,360,492.

(Continued)

(51) Int. Cl.
*G05D 3/10* (2006.01)
*G01S 3/786* (2006.01)
*H02S 20/32* (2014.01)

(52) U.S. Cl.
CPC ............ *G05D 3/105* (2013.01); *G01S 3/7861* (2013.01); *H02S 20/32* (2014.12)

(58) Field of Classification Search
CPC ....... G05D 3/105; G01S 3/7861; H02S 20/32; F24S 30/425; F24S 2201/00; F24S 50/20
See application file for complete search history.

(56) References Cited

U.S. PATENT DOCUMENTS 8,630,293 B2 * 1/2014 Cohen .................... F03G 6/067
  370/392
8,754,627 B1 * 6/2014 Le ............................ G05F 1/67
  323/299

(Continued)

FOREIGN PATENT DOCUMENTS

CN    104460705 A    3/2015
WO    2010003115 A1   1/2010

OTHER PUBLICATIONS

Supplementary European Search Report for European Application No. 20870496 dated Apr. 28, 2023.

(Continued)

*Primary Examiner* — Seung C Sohn
(74) *Attorney, Agent, or Firm* — MASCHOFF BRENNAN

(57) ABSTRACT

A method may include orienting a set of solar power units in a first position in which rows of solar power units are shaded by adjacent rows of solar power units; and monitoring energy generated by the set of solar power units over a window of time, that includes from when the set of solar power units are oriented in the first position until a sun angle corresponds to none of the rows being shaded by the adjacent rows. The method may include identifying a knee in energy generation during the first window of time, where the knee indicates a transition from higher to lower rates of change of energy generation at a given solar angle. The method may include plotting a trajectory of future orientation positions over time of the set of solar power units that include an orientation and time corresponding to the given solar angle.

20 Claims, 13 Drawing Sheets

Related U.S. Application Data

(60) Provisional application No. 62/909,755, filed on Oct. 2, 2019, provisional application No. 62/909,756, filed on Oct. 2, 2019.

(56) References Cited

U.S. PATENT DOCUMENTS

| | | |
|---|---|---|
| 11,360,492 B2 * | 6/2022 | Lee .................. H02S 20/32 |
| 2007/0084502 A1 | 4/2007 | Kelly et al. |
| 2010/0212653 A1 | 8/2010 | McDonald |
| 2011/0290306 A1 | 12/2011 | Roberts |
| 2013/0257155 A1 | 10/2013 | Judkins et al. |
| 2017/0353145 A1 | 12/2017 | Yang |

OTHER PUBLICATIONS

Supplementary European Search Report for European Application No. 20871839 dated Apr. 28, 2023.

* cited by examiner

SOLAR TRACKING SYSTEM

CROSS-REFERENCE TO RELATED APPLICATIONS

The present application is a Continuation of U.S. patent application Ser. No. 17/061,341, which was filed on Oct. 1, 2020, and claims the benefit and priority of United States Provisional Patent Application Ser. No. 62/909,755, entitled SOLAR TRACKING SYSTEM, which was filed on Oct. 2, 2019, and U.S. Provisional Patent Application Ser. No. 62/909,756, entitled SOLAR TRACKING DURING PERSISTENT CLOUDY CONDITIONS, which was filed on Oct. 2, 2019, each application is hereby incorporated by reference in its entirety.

FIELD

The present disclosure generally relates to solar tracking systems. In particular, some example embodiments may relate to solar backtracking. Additionally, some example embodiments may relate to solar tracking during persistent cloudy conditions, and/or the detection of such conditions.

BRIEF DESCRIPTION OF RELATED ART

Solar panels and solar arrays have been in use for years. Solar panels have been placed on homes and businesses for localized generation of electricity. Additionally, large sites have been created where rows of solar panels are used for large-scale electricity generation. Efforts have been made to improve the solar panels themselves.

The subject matter claimed herein is not limited to embodiments that solve any disadvantages or that operate only in environments such as those described. Rather, this background is only provided to illustrate one example technology area where some embodiments described herein may be practiced.

BRIEF SUMMARY OF EXAMPLE EMBODIMENTS

A need may exist for a system that can position solar panels to obtain as much sunlight as possible. A need may also exist for a system that can position solar panels in one or more desired positions at one or more desired times and/or environment conditions. For example, the system may facilitate detection of cloudy conditions and the positioning of solar panels when such cloudy conditions exist to facilitate improved access to available light and/or improve energy generation. As another example, the system may facilitate orientation of solar panels to address shadows cast by successive rows of solar panels when the sun is low in the sky to facilitate improved access to available light and/or improve energy generation.

According to an example embodiment, a solar tracking system may include one or more rows of solar panels and one or more motors coupled to the one or more rows of solar panels to adjust an orientation of the one or more rows of solar panels. The solar tracking system may also include one or more sensors configured to monitor at least one of irradiance and/or electrical current generated by the one or more rows of solar panels, and the system may include a controller configured to perform operations. The operations may include comparing a reading of the sensor to a threshold value, and based on the reading being below the threshold value, identifying a potential cloudy condition. The operations may also include determining whether the potential cloudy condition is a persistent cloudy condition, and based on the potential cloudy condition being a persistent cloudy condition, sending instruction to one or more motors to adjust the one or more rows of solar panels to one or more desired positions, such as a stow position. The method may also include, based on a predicted cessation of the persistent cloudy condition, sending instruction to one or more motors to adjust one or more rows of solar panels to a tracked orientation that tracks a current sun position.

According to another example embodiment, a method may include orienting a set of solar power units in a position that avoids shade between adjacent solar power units in the set of solar power units, and monitoring energy generated by the set of solar power units. The method may also include, after the set of solar power units begins generating power, rotating the set of solar power units towards the sun in increments until the energy generated by the set of solar power units changes or decreases. The method may additionally include storing a first angle of the set of solar power units with a first corresponding time as a no-shade point, where the first angle may correspond to just prior to when the energy generated by the set of solar power units changes or decreases. The method may also include storing a second angle of the set of solar power units with a second corresponding time as a shade point, where the second angle may correspond to when the energy generated by the set of solar power units changes or decreases. The method may additionally include monitoring energy generated by the set of solar power units until the energy generated by the set of solar power units is an expected value, such as an expected value with no shade. The method may also include storing a third angle of the set of solar power units with a third corresponding time as a shade point, where the third angle may correspond to just prior to when the energy generated by the set of solar power units is an expected value with no shade, and storing a fourth angle of the set of solar power units with a fourth corresponding time as a no-shade point, where the fourth angle may correspond to when the energy generated by the set of solar power units reached an expected value with no shade. The method may additionally include repeating the rotating, storing, and monitoring operations until a curve of no-shade points is generated for a first day, extrapolating the curve to a second day based on known angles of the sun on the second day relative to the first day, and orienting the set of solar power units on the second day based on the extrapolated curve.

According to an additional example embodiment, a method may include orienting one or more solar power units in a first position in which one or more rows of solar power units may be shaded, such as by one or more adjacent rows of solar power units; and monitoring energy generated by the solar power units over a first window of time, where the first window of time may include from when the solar power units are oriented in the first position until a sun angle corresponds to none of the rows of solar power units being shaded, such as by the adjacent rows of solar power units. The method may also include identifying a knee in energy generation during the first window of time, where the knee indicates a transition from a higher rate of change of energy generation to a lower rate of change of energy generation at a given solar angle. The method may also include plotting a trajectory of future orientation positions over time of the solar power units that may include an orientation and time corresponding to the given solar angle.

According to any of the examples of systems, operations, and/or methods, the first window of time may be before the sun angle is at a zenith.

According to an additional example embodiment, a method may include orienting one or more solar power units in a second position in which one or more rows of solar power units may be in full sun (e.g., may not be shaded); and monitoring energy generated by the solar power units over a second window of time, where the second window of time may include from when the solar power units are oriented in the second position until a sun angle corresponds to all of the rows of solar power units being shaded, such as by adjacent rows of solar power units. The method may also include identifying a knee in energy generation during the second window of time, where the knee indicates a transition from a lower rate of change of energy generation to a higher rate of change of energy generation at a given solar angle. The method may also include plotting a trajectory of future orientation positions over time of the solar power units that may include an orientation and time corresponding to the given solar angle.

According to any of the examples of systems, operations, and/or methods in accordance with the present disclosure, the second window of time may be after the sun angle is at a zenith.

According to any of the examples of systems, operations, and/or methods, such operations and/or methods may further include rotating solar power units to follow the trajectory of future orientation positions over time. After reviewing the present disclosure, one skilled in the art will appreciate that a set of solar power units may include any suitable number and/or arrangement of solar power units, solar panels, rows of solar panels, and the like, depending, for example, upon the size, shape, configuration, and/or arrangement of the system or apparatus.

According to any of the examples of systems, operations, and/or methods, such operations and/or methods may further include identifying a set of candidate solar angles from multiple days based on candidate knees in the first window of time for each of the multiple days, where the set of candidate solar angles may include the given solar angle. Such operations and/or methods may also further include selecting the given solar angle as a flexion point based on a histogram of the candidate solar angles identifying the given solar angle as a most frequently occurring solar angle.

According to any of the examples of systems, operations, and/or methods, such operations and/or methods may further include detecting two peaks in a histogram of the candidate solar angles, and may include down-sampling the candidate solar angles prior to the identifying the given solar angle as the most frequently occurring solar angle.

According to any of the examples of systems, operations, and/or methods, such operations and/or methods may further include orienting one or more solar power units in a second position in which one or more rows of solar power units are shaded by one or more adjacent rows of solar power units. Such operations and/or methods may also further include monitoring the energy generated by the solar power units over a second window of time, where the second window of time may include from when the solar power units are oriented in the second position until the sun angle corresponds to none of the rows of solar power units being shaded by the adjacent rows of solar power units. Such operations and/or methods may also further include identifying a second knee in energy generation during the second window of time, where the second knee may indicate a transition from a second higher rate of change of energy generation to a second lower rate of change of energy generation at a second given solar angle, and where plotting the trajectory of future orientation positions over time may include both the orientation and time corresponding to the given solar angle and a second orientation and second time corresponding to the second given solar angle.

According to any of the examples of systems, operations, and/or methods, one or more rows of solar power units may be oriented and monitored in multiple positions (such as a first position and at least one additional position) to identify separate knees such that there may be separate given solar angles for each of the positions.

According to any of the examples of systems, operations, and/or methods, both the first window of time and the second window of time may be before the sun angle is at a zenith, or both the first window of time and the second window of time may be after the sun angle is at the zenith.

According to any of the examples of systems, operations, and/or methods, plotting the trajectory of future orientation positions over time may include positioning a known curve of orientations such that the orientation and the time corresponding to the given solar angle is on the known curve.

According to any of the examples of systems, operations, and/or methods, monitoring the energy generated by the solar power units over the first window of time may include accumulating detected energy generation across multiple rows of the solar power units.

According to an additional example embodiment, a system may include one or more solar power units, where the solar power units may include a first row of solar power units and a second row of solar power units, which may be disposed generally adjacent to and/or generally parallel with the first row of solar power units, a motor configured to change orientation of at least one row of the solar power units, and a sensor configured to monitor an amount of energy generated by the solar power units. The system may also include a controller in communication with the motor and the sensor, the controller may be configured to perform operations, the operation may include orienting at least the first row of the solar power units in a first position in which the first row of solar power units is at least partially shaded by, for example, the second row of solar power units, and monitoring data from a sensor regarding energy generated by at least one of the solar power units over a first window of time, where the first window of time may include from when the first row of the solar power units is oriented in the first position until a sun angle corresponds to when the first row of solar power units is out of shade cast by the second row of solar power units. The operations may also include identifying a knee in energy generation during the first window of time, where the knee may indicate a transition from a higher rate of change of energy generation to a lower rate of change of energy generation at a given solar angle, and plotting a trajectory of future orientation positions over time of the solar power units that may include an orientation and time corresponding to the given solar angle.

According to any of the examples of systems, operations, and/or methods, the motor may control orientation of the first row of solar power units and a second motor may control orientation of the second row of solar power units.

According to any of the examples of systems, operations, and/or methods, a sensor may monitor the amount of energy generated by the first row of solar power units and a second sensor may monitor the amount of energy generated by the second row of solar power units.

According to any of the examples of systems, operations, and/or methods, monitoring the energy generated by a set of solar power units over the first window of time may include accumulating detected energy generation across the first row of solar power units and additional rows of the solar power units.

According to an additional example embodiment, a method may include obtaining current data from a sensor related to performance of a solar power generating device, and comparing the current data from the sensor to previously stored data to detect a decrease or change in expected power generation. The method may also include determining whether the decrease or change in expected power generation is designated a persistently occurring decrease, and, based on the designation of the decrease as being persistent, changing an orientation of the solar power generating device to a stowed orientation.

According to any of the examples of systems, operations, and/or methods, the stowed orientation may be a first stowed orientation of a set of potential stowed orientations.

According to any of the examples of systems, operations, and/or methods, the first stowed orientation may be selected instead of other stowed orientations of a set of potential stowed orientations based on the first stowed orientation being closest to a tracked orientation, where the tracked orientation may correspond to an orientation associated with a tracking algorithm that orients the solar power generating towards a current sun position as the sun moves across the sky.

According to any of the examples of systems, operations, and/or methods, such operations and/or methods may further include moving the orientation of the solar power generating device from a first stowed orientation to a second stowed orientation at a second point in time based on the second stowed orientation being closest to the tracked orientation associated with the second point in time.

According to any of the examples of systems, operations, and/or methods, the set of potential stowed orientations may exclude horizontal.

According to any of the examples of systems, operations, and/or methods, the set of potential stowed orientations may include approximately −20 degrees, approximately −10 degrees, approximately −5 degrees, approximately 5 degrees, approximately 10 degrees, or approximately 20 degrees from horizontal.

According to any of the examples of systems, operations, and/or methods, the stowed orientation may be off from horizontal.

According to any of the examples of systems, operations, and/or methods, such operations and/or methods may further include detecting a cessation of the persistent decrease in expected power generation, and, which may be based on the detected cessation, changing the orientation of the solar power generating device to a tracked orientation, where the tracked orientation may be associated with a tracking algorithm that orients the solar power generating device towards a current sun position as the sun moves across the sky.

According to any of the examples of systems, operations, and/or methods, such operations and/or methods may further include monitoring for additional potentially cloudy conditions, and, based on the additional potentially cloudy conditions being persistent cloudy conditions, adjusting the solar power generating device to the stowed orientation.

According to any of the examples of systems, operations, and/or methods, such operations and/or methods may further include tracking a number of times the additional potentially cloudy conditions are persistent cloudy conditions, and, based on the number of times exceeding a threshold, ceasing adjusting the solar power generating device to the stowed orientation for a period of time.

According to any of the examples of systems, operations, and/or methods, changing the orientation of the solar power generating device may be further based on a current orientation of the solar power generating device being outside of a central range of orientations.

According to any of the examples of systems, operations, and/or methods, the central range may be between approximately −5 degrees and 5 degrees from horizontal.

According to any of the examples of systems, operations, and/or methods, the sensor may be configured to monitor for irradiance.

According to any of the examples of systems, operations, and/or methods, the sensor may be configured to monitor for current.

According to any of the examples of systems, operations, and/or methods, determining whether the decrease in expected power generation is designated a persistently occurring decrease may include performing statistical analysis on data related to the solar power generating device, where the data may include at least one of historical irradiance data and historical data of electrical current generated by the solar power generating device, and where the statistical analysis may consider variance in the data within a threshold time and rate of change of the data.

According to any of the examples of systems, operations, and/or methods, the statistical analysis may include a decay algorithm such that more recent data is weighted more heavily than older data.

According to any of the examples of systems, operations, and/or methods, the designation of the decrease in expected power generation as persistent may be based on the variance in the data being below a variance threshold and/or an amount of power generated being below a power generation threshold.

According to an additional example embodiment, a solar tracking system may include one or more rows of solar panels, one or more motors coupled to one or more rows of solar panels to adjust an orientation of one or more rows of solar panels, and a sensor configured to monitor at least one of irradiance and electrical current generated by one or more rows of solar panels. The system may also include a controller configured to perform operations, the operations including comparing a reading of the sensor to a threshold value, and based on the reading being below the threshold value, for example, identifying a potential cloudy condition. The operations may also include determining whether the potential cloudy condition may be designated a persistent cloudy condition. The operations may additionally include, based on the potential cloudy condition being designated as a persistent cloudy condition, sending a first instruction to one or more motor to adjust one or more rows of solar panels to a stowed orientation. The operations may additionally include, based on a predicted cessation of the persistent cloudy condition, sending a second instruction to one or more motors to adjust one or more rows of solar panels to a tracked orientation that tracks a current sun position.

The object and advantages of the embodiments may be realized and achieved at least by one or more of the elements, features, and combinations particularly pointed out in the claims.

It is to be understood that both the foregoing general description and the following detailed description serve as examples and are explanatory and are not restrictive of the invention, as claimed.

BRIEF DESCRIPTION OF THE DRAWINGS

The appended drawings contain figures of preferred embodiments to further illustrate and clarify the above and other aspects, advantages, and features of the present disclosure. It will be appreciated that these drawings depict only example embodiments of the disclosure and are not intended to limit its scope. The present disclosure will be described and explained with additional specificity and detail through the use of the accompanying drawings in which.

DETAILED DESCRIPTION OF SOME EXAMPLE EMBODIMENTS

Figure 1:
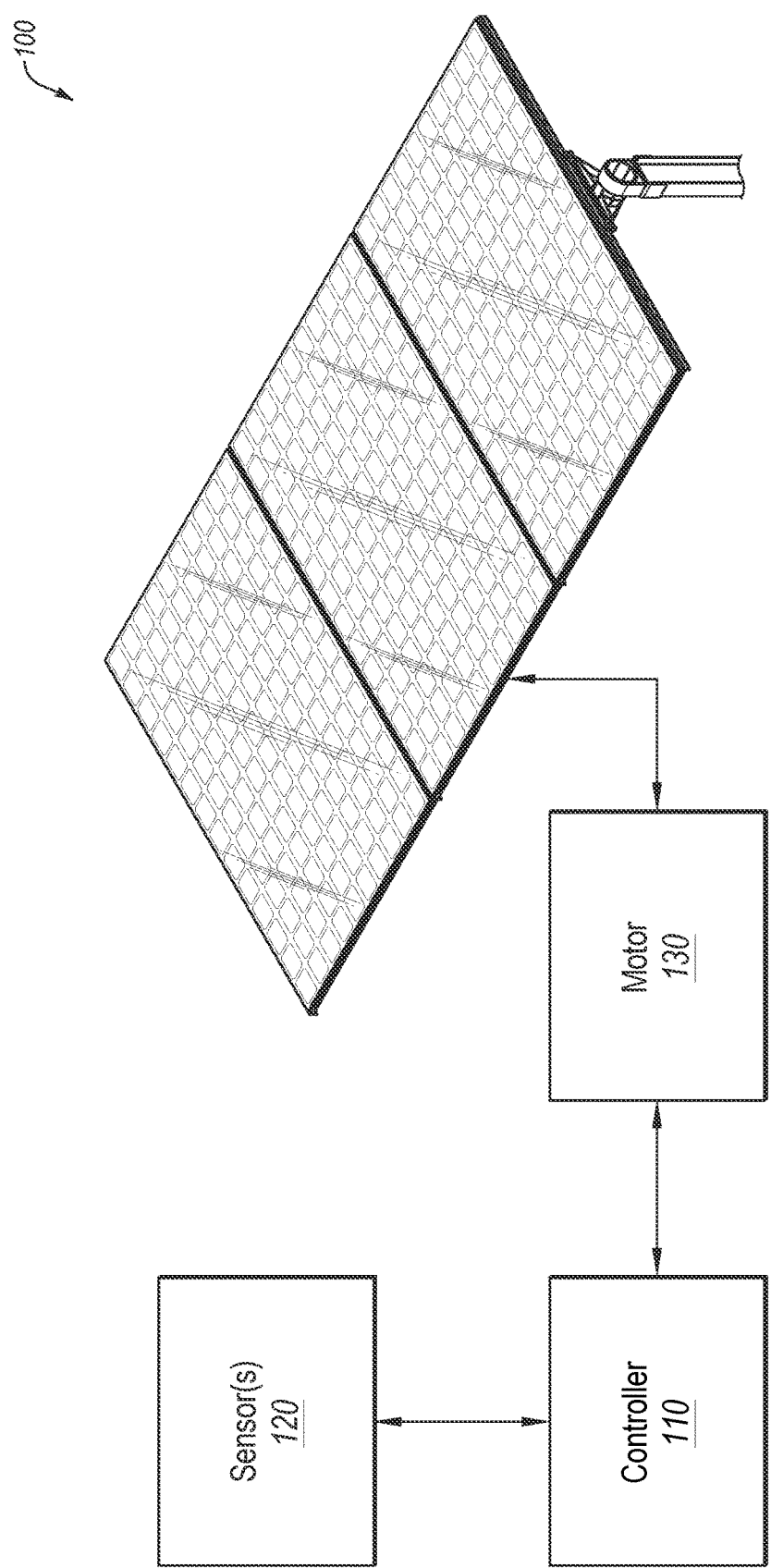
FIG. 1 illustrates an example solar tracking system.

The solar tracking system, in accordance with an example embodiment of the disclosure, may work with different types of structures and approaches. For example, the solar tracking system may work with solar tracking approaches in which one or more rows of solar panels may be oriented to point directly in the direction normal to the sun for dual axis trackers (e.g., trackers that are able to adjust the orientation of the solar panels along two distinct axes) or to point directly in the direction normal to the east-west component of the sun's irradiance for single axis trackers (e.g., trackers that are able to adjust the orientation of the solar panels along a single axis tilting from east to west). The solar tracking system may also work with tracking approaches that account for shading, such as row-to-row shading, where the shadow from one row of solar panels casts shade upon an adjacent row, which may decrease overall productivity of the solar panels. The normal tracking may be overridden with a backtracking approach that avoids, decreases, and/or minimizes shading, such as row-to-row shading, even if the panels are no longer pointed directly normal to the sun (or the east-west component of the sun's irradiance). According to one or more example embodiments, the orientation of the solar panels during backtracking may be determined once, and extrapolated for multiple days throughout the year. Such an approach may avoid expensive sensors and monitors that can fail and malfunction, while enjoying the improved efficiencies of customized backtracking.

In times of persistently cloudy conditions, some or all the light for a solar panel may be coming from all or multiple directions because of the diffusion of light by the clouds. However, even in cloudy conditions, most tracking algorithms simply follow the position of the sun. This shortcoming may be avoided by providing improvements to the identification of persistently cloudy conditions, the positioning of solar cells to a more advantageous orientation when such a condition exists, and/or returning the solar panels to the normal sun-tracked position in a timely manner.

At least some embodiments may be directed towards solar tracking during persistent cloudy conditions, and the detection of such conditions. The principles of the present disclosure, however, are not limited to solar tracking. It will be understood that, in light of the present disclosure, the components and arrangements disclosed herein can be successfully used in connection with other circumstances and environments.

At least some embodiments may be related to the initial generation of a backtracking curve via which a motor may orient a set of solar power units (e.g., solar power cells, rows of solar power cells, solar panels, rows of solar panels, etc.) at specific angles during backtracking periods to avoid and/or minimize shading, such as shading between adjacent solar power units.

Additionally, to assist in the description of the solar tracking systems, words such as top, bottom, front, rear, right, and left may be used to describe the accompanying figures. It will be appreciated that the solar tracking systems can be disposed in other positions, used in a variety of situations and may perform a number of different functions. In addition, the drawings may be to scale and may illustrate various configurations, arrangements, aspects, and features of the solar tracking systems. It will be appreciated, however, that the solar tracking systems may have other suitable shapes, sizes, configurations, and arrangements depending, for example, upon the intended use or scale of project of the solar tracking systems. Further, the solar tracking systems may include any suitable number or combination of aspects, features and the like. A detailed description of exemplary embodiments of the solar tracking systems now follows.

FIG. 1 illustrates an example solar tracking system 100, in accordance with one or more embodiments of the present disclosure. As illustrated in FIG. 1, the solar tracking system 100 may include a controller 110 in communication with a sensor 120 and a motor 130. The motor 130 may be in communication with one or more solar panels, one or more rows of solar panels, and the like. In FIG. 1, an example row of solar panels 140 is illustrated for convenience. The controller 110 may be configured to provide guidance to the motor 130 as to what orientation in which the solar panels 140 are to be positioned. In normal operation, the motor 130 may facilitate tracking the location of the sun with the solar panels 140 such that the solar panels 140 may be generally oriented normal to the sun or normal to the east-west portion of the irradiance of the sun, which may facilitate increased electrical energy generation. As described herein, in some embodiments, the solar tracking system 100 may deviate from the normal tracking orientation. For example, in persistently cloudy conditions, the motor 130 may move the solar panels to a different position, such as a generally horizontal position. Additionally or alternatively, the solar tracking system 100 may operate according to a backtracking curve in which the orientations may be off from normal to reduce shading, such as shading between adjacent rows of solar panels 140.

Backtracking Curve Generation

To generate a backtracking curve, in an example embodiment, an initial curve for a sample day may be generated. In these and other embodiments, the controller 110 may monitor various orientations (e.g., angles) of the row of solar panels 140 as set by the motor 130 in which the solar panels 140 are in shade or out of shade as indicated by data from the sensor 120.

To generate an initial backtracking curve, before the sun has risen (or early in the sun's climb), the controller 110 may send a message to the motor 130 to orient the row of solar panels in a horizontal position or sufficiently horizontal position such that no or minimal shading is experienced between rows of the solar panels 140. As the sun begins to rise and the solar panels 140 being to generate electricity as indicated by the sensor 120, the controller 110 may send a message to the motor 130 to rotate the row of solar panels towards the sun until shading begins to occur. The detection of shading may be observed by the sensor 120 indicating a decrease in the amount of electricity generated by the solar panels 140. Once the shading begins to occur, the angle of the solar panels 140 just prior to shading may be stored as a data point with a corresponding time as a no-shade point, and the angle of the solar panels 140 just after the shading may be stored as a data point with a corresponding time as a shade point. The controller 110 may then monitor the generation of electricity as indicated by the sensor 120 until the solar panels 140 are no longer shaded. For example, the controller 110 may monitor the electricity generated by the solar panels to observe when the amount generated is consistent with the amount expected without shade, or when the rate of change of the amount generated decreases to a rate consistent with the rising of the sun in the sky rather than the rate of change of reducing or removing shading. When the controller 110 determines that a no-shade condition exists, the controller 110 may store the angle of the solar panels 140 and a corresponding time as a no-shade point. The controller 110 may then send a message to the motor 130 to rotate the solar panels 140 until a shade condition is again experienced. When shade is again experienced the corresponding no-shade angle just prior to the shade condition and the shade point just after the shade condition may be stored with their corresponding times. In this manner, the controller 110 may repeatedly create shade, allow the sun to move to remove the shade, and create shade, thereby creating a series of points of angels of the solar panels that are known to be no-shade conditions during the rising of the sun. After a certain point in the rise of the sun in which no further shading is experienced, the controller 110 may transition to a tracking approach in which the motor 130 may orient the solar panels 140 along a normal tracking orientation.

In some embodiments, in the morning hours, the controller 110 may direct the motor 130 to rotate the solar panels 140 until some or all of the rows of solar panels 140 experience shade. The controller 110 may maintain the same orientation as the sun rises, shifting the shadows of the adjacent rows until some or all of the rows of solar panels 140 are out of shade from adjacent rows. The controller 110 may identify the point at which the energy generation as detected by the sensor 120 changes from one higher rate of change of energy generation (due to decreasing shade), to a lower rate of change of energy generation (due to increased irradiance) as a transition point from shade to no shade corresponding to the time of day and/or solar angle. The transition point may be used as a flexion point to fit or otherwise locate a curve to the transition point.

A similar approach may be taken during the afternoon/evening, but in reverse. For example, the controller 110 may monitor when the sun has dropped far enough to start shading one or more rows of solar panels 140. When the first instance of shading is observed (e.g., a decrease in generation of electricity as observed by the sensor 120 due to shading rather than the setting of the sun), the angle of the solar panels 140 and the corresponding time may be stored as a shade point. The controller 110 may then send a message to the motor 130 to rotate the solar panels 140 until a no-shade condition is detected. The no-shade condition may be stored with the angle and the corresponding time, and a shade condition may be stored along with the corresponding time just prior to the no-shade condition. The solar panels 140 may be held still until the sun drops far enough to create another shade condition. When the shade condition is detected, the angle of the solar panels 140 and the corresponding time may be stored as a shade point, and a no-shade condition may be stored along with the corresponding time just prior to the shade condition. In this manner, the controller 110 may direct the motor 130 to repeatedly rotate the solar panels 140 until no-shade conditions are created, followed by waiting for the sun to drop far enough to create the shade condition, and generating a series of points of shade and no-shade with corresponding times.

In some embodiments, in the afternoon hours, the controller 110 may direct the motor 130 to rotate the solar panels 140 until some or none of the rows of solar panels 140 experience shade. The controller 110 may then maintain the same orientation as the sun continues to descend and moves some or all of the rows of solar panels 140 into shade. The controller 110 may identify the point at which the energy generation as detected by the sensor 120 changes from one lower rate of change of energy generation (due to decreasing irradiance), to a higher rate of change of energy generation (due to decreased irradiance and shading over the row of solar panels 140) as a transition point from no shade to shade corresponding to the time of day and/or solar angle. The transition point may be used as a flexion point to fit or otherwise locate a backtracking curve to the transition point in the afternoon hours.

In some embodiments, the existence of a shade condition may be based on one or more factors that may or may not be caused by shade. For example, the sensor 120 may monitor amount of electricity generated. In these and other embodiments, a variety of causes (e.g., angle of landscape, etc.) may contribute to change in generation of electricity, but for whatever the cause, the controller 110 may recognize the decrease in electricity generation in "shade" conditions and increase in electricity generation in "no-shade" conditions. In some embodiments, the amount of decrease may be set at a threshold beyond that which may be caused by rising/setting of the sun. In these and other embodiments, any decreases in production beyond the threshold, whether caused by shading from adjacent rows of solar panels, landscaping changes, etc., may be accounted for in the backtracking curve.

In some embodiments, a time-out or fail-safe point may be used to facilitate efficient curve generation. For example, the standard tracking algorithm (e.g., the normal tracking) may include minimum and maximum angles of orientation of the solar panels 140. For any given point when the motor 130 is rotating the solar panels 140 to transition to a shade or no-shade condition but that condition is not detected, when the maximum or minimum of the standard tracking algorithm is reached the controller 110 may skip that point in time and instruct the motor 130 to move the solar panels 140 back to their previous position.

When recording the angles of the solar panels 140 and the corresponding times, the corresponding power generated at the point in time may also be recorded to verify/observe whether the point in time was a shade or a no-shade point.

In some embodiments, the no-shade and/or shade conditions may be validated using a ratio of site irradiance as obtained by the sensor 120 and/or another sensor and/or meter at the location of the solar panels 140 and the electricity generated as measured by the sensor 120. In these and other embodiments, a correction factor may be used based on the orientation of the sensor 120 as opposed to the orientation of the solar panels 140. By using a ratio of the irradiance data, the validating sensor need not be calibrated or particularly accurate regarding the absolute value of irradiance or sky tracking. Rather, the relative value of the irradiance is all that is used to validate the no-shade and/or shade condition. Additionally, by using the irradiance data, decreases in electricity generation caused by factors such as cloud cover etc. may be excluded from indicating a no-shade and/or shade point.

Using the data points, a backtracking curve for the day of the year measured may be generated. The backtracking curve may include a series of angles of the solar panels 140 and a corresponding angle of the sun relative to the horizon as determined by a known relationship between the time of the data point and the angle of the sun (e.g., from an almanac or other resource).

After the initial backtracking curve has been generated to include angles of the sun with the horizon and corresponding angles of the solar panels to avoid shading from adjacent solar panels 140 (or other artifacts reducing electricity generation), corresponding backtracking curves for each day of the year may be generated. For example, a similar known relationship between the date/time and angle of the sun may be used to generate a schedule of times and angles of the solar panels for a given day of the year based on what the angles of the sun will be for that given day of the year and using the angles of the solar panels 140 found to avoid shading at the particular angle of the sun. Using such an approach, a single day of tracking the shade/no-shade of the solar panels 140 may be used to generate all backtracking curves for every day of the year. Doing so may permit the use of customized backtracking without complex sky tracking, expensive sensors that may fail, extensive communication networks, etc.

Additional examples of generating a backtracking curve may be illustrated in other embodiments, such as illustrated in FIGS. 4A-9.

Diffuse Light Modifications

In some embodiments, the controller 110 may receive data from the sensor 120 related to performance of the solar panels 140. For example, the data from the sensor 120 may include irradiance data, or may include electrical current being generated by the solar panels 140. By using data from such a sensor, the sensor 120 may include or consist of a component already part of the infrastructure of a solar tracking system 100 without adding additional hardware. For example, the sensor 120 may simply listen in or monitor the amount of current being generated, a process which may already take place.

Using the data regarding performance of the solar panels 140, the controller 110 may determine whether or not a potential cloudy condition exists. For example, the controller 110 may monitor the current or irradiance compared to expected values or typical values for the solar tracking system, such as values when the solar panels 140 are exposed to direct sunlight for the given time of day and/or year. If the generation values are below typical values by a certain amount or threshold amount, the controller 110 may identify the condition as a potential cloudy condition. The amount below the typical values (e.g., the threshold values) may be those that are consistent with a diffuse condition, e.g., a condition in which the eye is unable to detect the location of the sun as the light from the sun has been so diffused by the clouds. In these and other embodiments, the expected or typical values may be values that were previously recorded and stored in a manner accessible to the controller 110 or may be calculated for the given time in question based on known data and/or formulas.

When a potential cloudy condition is detected, the controller 110 may observe and/or analyze recent data from the sensor 120 to determine whether or not the cloudy condition is a persistent cloudy condition or a transient cloudy condition. For transient cloudy conditions, the intention of the solar tracking system 100 may be configured to maintain the solar panels 140 in their typical tracked orientation such that the solar panels 140 may obtain as much sunlight as possible for a maximum amount of electricity generation. For persistent cloudy conditions, the intention of the solar tracking system 100 may be to adjust the orientation of the solar panels 140 to increase or maximize the amount of electricity generation. One example approach to detecting and/or modifying orientations of solar power generating devices may be described with reference to FIG. 10.

To determine whether or not the cloudy condition is transient or persistent, recent data points may be analyzed to consider the variance in the recent data and the rate of change of the recent data, or other statistical analysis of the recent data points. For example, the data points within a previous time window or a threshold time (such as the previous thirty seconds, the previous one minute, the previous five minutes, the previous ten minutes, the previous hour, etc.) may be considered. As another example, the data points may be considered with a decaying function such that the more recent data is more pertinent to the inquiry and the older data is discounted and considered less applicable (e.g., the time entries for the most recent minute are weighted more than the time entries for ten minutes ago). In these and other embodiments, if the variance and/or the rate of change of the data under consideration shows that the data is stable (e.g., low variance and low rate of change), the cloudy condition may be identified as persistent. If the variance and/or the rate of change of the data under consideration shows that the data is continuing to shift and change, the cloudy condition may be identified as transient (or not yet existing long enough to qualify as a persistent cloudy condition).

The sensor 120 may include any component able to sense, monitor, meter, or otherwise measure irradiance, light, and/or electrical current or generation. The sensor 120 may sense or help determine if the electricity generated by the solar panels 140, or a portion of the solar panels such as a row of solar panels, has decreased. For example, the sensor 120 may sense or help determine if the electricity generated has decreased from an expected amount that is generally equal to or greater than about ten percent (10%), generally equal to or greater than about twenty percent (20%); generally equal to or greater than about thirty percent (30%); generally equal to or greater than about forty percent (40%); generally equal to or greater than about fifty percent (50%); generally equal to or greater than about sixty percent (60%); generally equal to or greater than about seventy percent (70%); generally equal to or greater than about eighty percent (80%); generally equal to or greater than about ninety percent (90%); or more. The system 100 may determine that a persistent or potential cloudy condition exists if the electricity generated is less than a certain amount for a period of time, such as about five minutes, about ten minutes, about fifteen minutes, about twenty minutes, about twenty-five minutes, about thirty minutes, or more. Thus, in an example embodiment, persistent or potential cloudy conditions may be at least partially determined by a decrease in electricity over a period of time in comparison to a normal or expected amount of electricity generated in a corresponding period of time.

After identifying the potential cloudy condition as a persistent cloudy condition, the controller 110 may send instructions to the motor 130 to adjust the orientation of the solar panels 140 to a stowed orientation. The stowed orientation may refer to any orientation that is generally horizontal and/or generally parallel to the ground or support surfaces or structures, which may increase the overall aperture or exposure of the solar panels 140 to light and that may increase electrical generation of the solar panels 140 as compared to the solar panels 140 if they were following a typical tracked orientation. The stowed orientation may include any orientation between approximately −30 degrees and 30 degrees from horizontal, such as +/−20 degrees, +/−10 degrees, and/or +/−5 degrees from horizontal. In some embodiments, the stowed orientation may avoid horizontal. By avoiding a directly horizontal orientation, the solar panels 140 may be positioned to facilitate rain sliding off the solar panels 140 rather than pooling and soiling the solar panels 140. In these and other embodiments, by orienting the solar panels 140 slightly off from horizontal, the increased energy gain may be observed while also preventing water pooling on the solar panels 140.

In some embodiments, the stowed orientation may be selected based on where the solar panels 140 would be in their tracked orientation, e.g., where the sun is located in the sky. In these and other embodiments, the stowed orientation may be selected as the stowed orientation closest to where the sun is currently located. For example, if the solar panels 140 are tracking the sun and located at 40 degrees off from horizontal and a persistent cloudy condition is detected, the controller 110 may instruct the motor 130 may to adjust the orientation of the solar panels 140 to a stowed orientation of 20 degrees off from horizontal to increase the aperture of the solar panels 140 and their electricity generation during the persistently cloudy condition. By selecting the stowed orientation closest to where the sun is located, the transition back to the tracked orientation if or when the persistent cloudy condition ceases may be shorter. In some embodiments, the set of stowed orientations to select from may include two (e.g., +/−20 degrees), four (e.g., +/−20 degrees and +/−10 degrees), five (e.g., +/−20 degrees and +/−10 degrees, and horizontal), seven (e.g., +/−20 degrees, +/−10 degrees, +/−5 degrees and horizontal), etc.

In some embodiments, if the tracking orientation is within a central range of the stowed orientations (e.g., if the stowed orientations are +/−20 degrees and the current tracked orientation is 15 degrees), the controller 110 may elect not to send an instruction to adjust the orientation of the solar panels 140. In such an embodiment, if the solar panels 140 are already within the range which would be selected to accommodate the diffuse light situation, there may be no reason to adjust the orientation of the solar panels 140 so the switching to the stowed orientation may not occur.

In some embodiments, the controller 110 may periodically or continually check the location of the sun, e.g., the tracked orientation, and may send an instruction to adjust the stowed orientation accordingly. For example, once per hour, half hour, fifteen minutes, etc., the controller 110 may verify that the persistent cloudy condition is still present and may check that the stowed orientation is still the closest to the tracked orientation. If the tracked orientation has moved such that the closest stowed orientation is different, the controller 110 may send a signal to the motor 130 to adjust the orientation of the solar panels to the stowed orientation closest to the tracked orientation. Additionally, if the previous tracked orientation was within the stowed orientation, the updated tracked orientation may have moved outside of the range of the stowed orientation and the controller 110 may send a signal to the motor 130 to adjust the orientation of the solar panels to the stowed orientation closest to the updated tracked orientation.

The controller 110 may periodically check to see if the persistent cloudy condition has ceased or may be ending soon. For example, the controller 110 may periodically or continually monitor the data from the sensor 120 to detect changes in the performance of the solar panels 140. If the data from the sensor 120 indicates changes that increase the performance above the threshold for a certain amount of time, or a certain number of times within a predefined window of time, the controller 110 may determine that the persistent cloudy condition may be ending or may end soon. In these and other embodiments, based on such a determination, the controller 110 may send a signal to the motor 130 instructing the motor 130 to resume the normal tracked orientation of the solar panels 140. In these and other embodiments, the controller 110 may periodically monitor the data (e.g., may check the data every thirty seconds, every minute, every two minutes, every five minutes, every ten minutes, every thirty minutes, every hour, etc.), or may continuously monitor the data. In some embodiments, a set window of data (e.g., the last thirty minutes of data) may be monitored and/or stored, and after analysis, may be discarded such that the window of time is a rolling window. In determining whether cessation has occurred, the data of the sensor 120 may be compared to actual or expected values for the solar panels with full sunlight at the stowed orientation rather than the tracked orientation for the given time of day and/or year.

In some embodiments, the controller 110 may continue to monitor for persistently cloudy conditions throughout the day, such that the controller 110 may instruct the motor 130 to shift the solar panels 140 out of the tracked orientation and to the stowed orientation multiple times throughout the day. In some embodiments, if such an instruction has been sent a certain threshold number of times, the controller 110 may cease sending such instructions to the motor 130. For example, if the controller 110 has shifted in and out four times within one day, the controller 110 may assume that the day will continue to be one of shifting clouds and simply follow the tracked orientation the remainder of the day. While four times in a day is used, any number of times within any window and any lockout duration may be used (e.g., two transitions within one hour may cause a six hour lockout, etc.).

By using such a system 100, a simple controller 110 may be used and the sensor 120 may be one already included as part of a typical photovoltaic (PV) system. This may avoid the use of additional parts which may fail and increased complexity and cost. Additionally, the use of complex sensors, sky-mapping, etc. may be avoided or omitted while still gaining an increase in electricity generation.

Modifications, additions, or omissions may be made to the solar tracking system 100 without departing from the scope of the present disclosure. For example, the designations of different elements in the manner described is meant to help explain concepts described herein and is not limiting. Further, the system 100 may include any number of other elements or may be implemented within other systems or contexts than those described. For example, the system 100 may include any number of rows of solar panels, sensors, controllers, etc.

Figure 2:
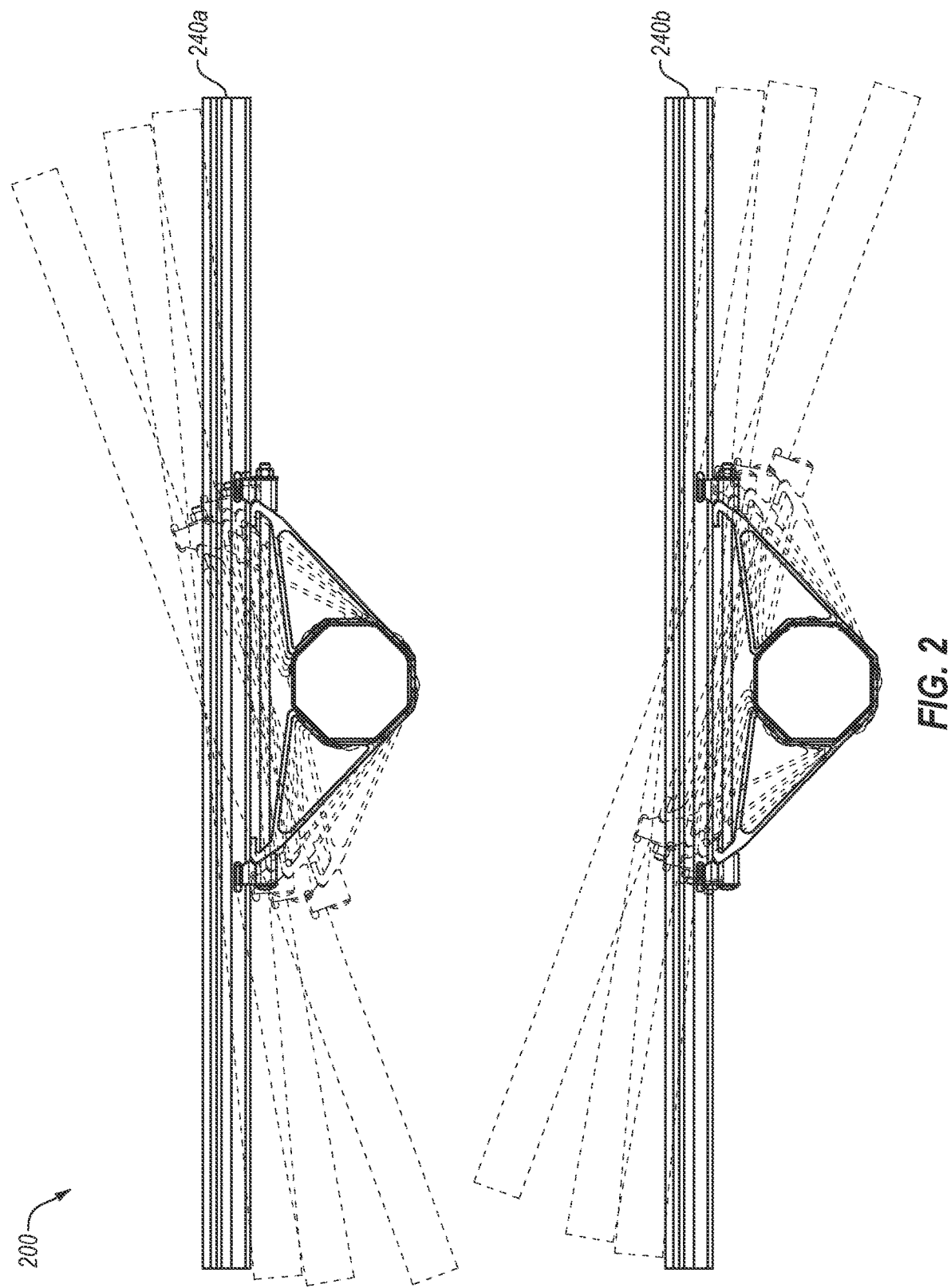
FIG. 2 illustrates example solar panels and associated rotations thereof.

FIG. 2 illustrates example solar panels 200 and associated rotations thereof, in accordance with one or more embodiments of the present disclosure. The solar panels 240*a* and 240*b* may be similar or comparable to a solar panel in the row of solar panels 140 of FIG. 1.

As illustrated in FIG. 2, the solar panels 240*a* illustrate that the solar panels 200 may be rotated to −5 degrees, −10 degrees, and/or −20 degrees from horizontal as options for a stowed orientation. Additionally or alternatively, the solar panels 240*b* illustrate that the solar panels 200 may be rotated to +5 degrees, +10 degrees, and/or +20 degrees from horizontal as options for the stowed orientation. After reviewing this disclosure, one skilled in the art will appreciate the solar panels 240*a* and/or 240*b* may be rotated any desired amount.

Modifications, additions, or omissions may be made to the solar panels 200 without departing from the scope of the present disclosure. For example, the solar panels 200 may be oriented at any angle for the stowed orientation.

Figure 3A:
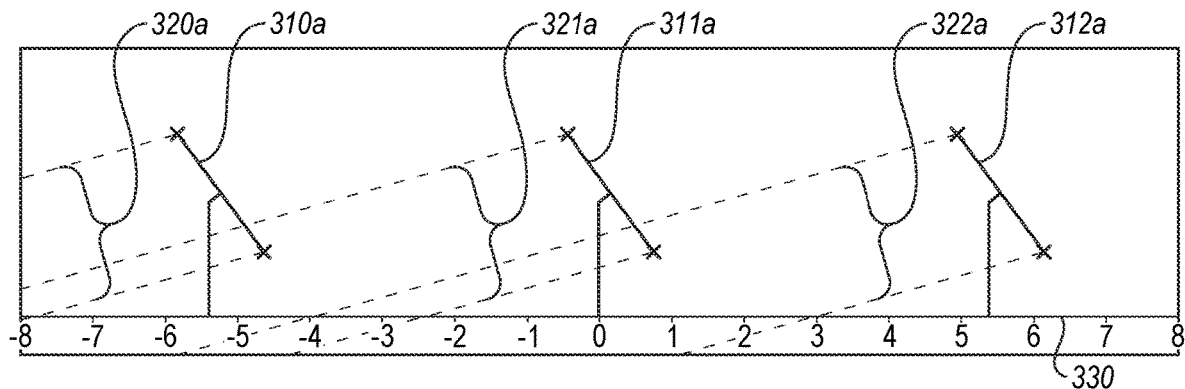
FIGS. 3A-3C illustrate example views of shade generated by one or more rows of solar panels.
Figure 3B:
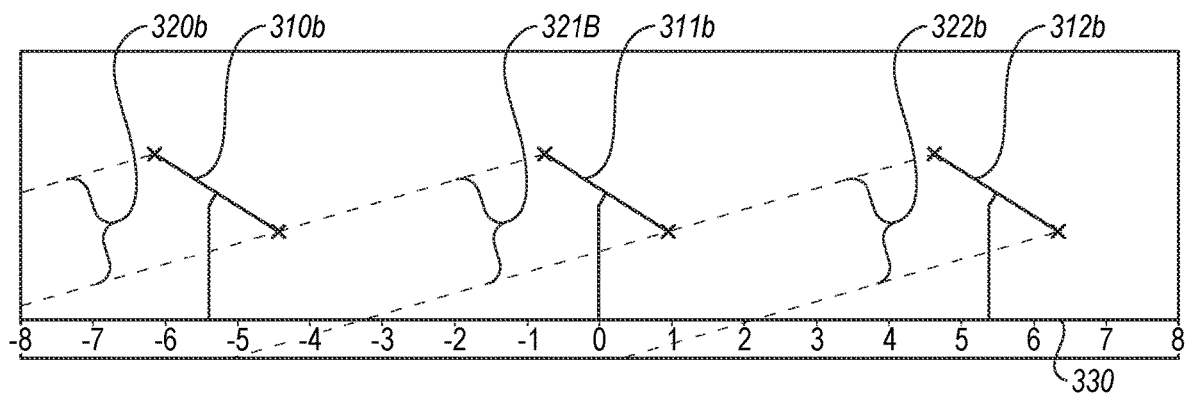
Figure 3C:
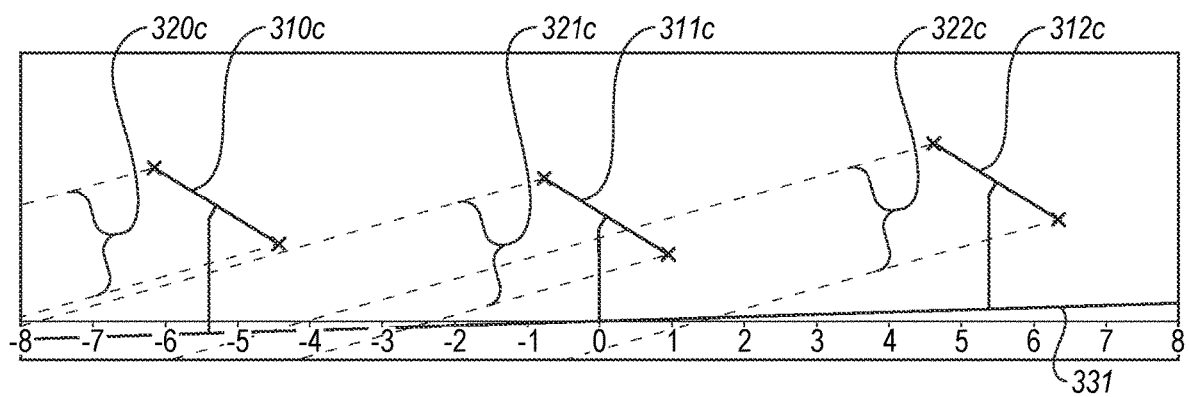

FIGS. 3A-3C illustrate example views of shade 320, 321, and 322 generated by rows of solar panels 310, 311, and 312, respectively. FIGS. 3A-3C serve to illustrate the role of backtracking and the complexities that may be involved based on different variations in environments.

As illustrated in FIG. 3A, the row 310*a* may cast a shadow 320*a*, the row may 311*a* cast a shadow 321*a*, and the row 312*a* may cast a shadow 322*a*. The rows may be mounted on the ground 330. When operating with a typical tracking algorithm and orienting the rows 310*a*, 311*a*, and 312*a* normal to the sun, when near the horizon, the shadow 322*a* may at least partially cover the row 311*a* and the shadow 321*a* may at least partially cover the row 310*a*, decreasing production.

As illustrated in FIG. 3B, in an ideal scenario with perfectly known spacing between the rows 310*b*, 311*b*, and 312*b* and the ground 330 perfectly flat, the orientation may be solved in which the shadow 322*b* of the row 312*b* may come right to the edge of the row 311*b* without covering the row 311*b*, and the shadow 321*b* of the row 311*b* may come right to the edge of the row 310*b* without covering the row 310*b*.

As illustrated in FIG. 3C, when the ground 331 is not perfectly flat or if the rows have different heights, then even if using the solved-for orientation of FIG. 3B, the shadow 322*c* may cover at least a portion of the row 311*c*, and/or the row 311*c* may be tilted off of an ideal position, which may lose potential energy generation due, for example, to the solar panel not being at least substantially orthogonal to the sun. To address the shading and/or overcompensation illustrated in FIGS. 3A and/or 3C, the present disclosure contemplates the generation of a backtracking algorithm to facilitate the orientation of one or more solar panels or one or more rows of solar panels to avoid shade while still orienting one or more solar panels or one or more rows of solar panels towards the sun.

Figure 4A:
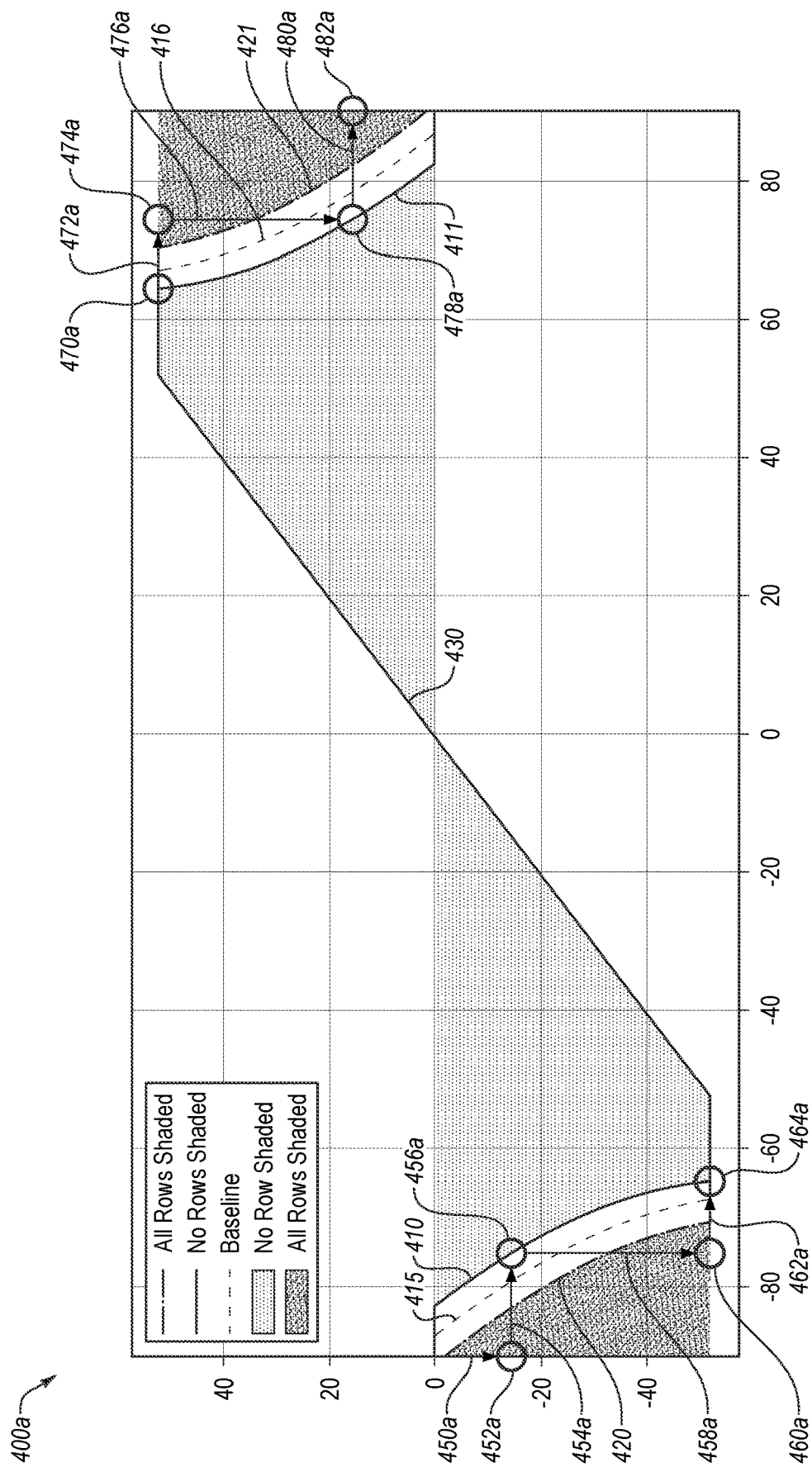
FIGS. 4A and 4B illustrate example plots of solar panel orientations relative to solar angle over a day.
Figure 4B:
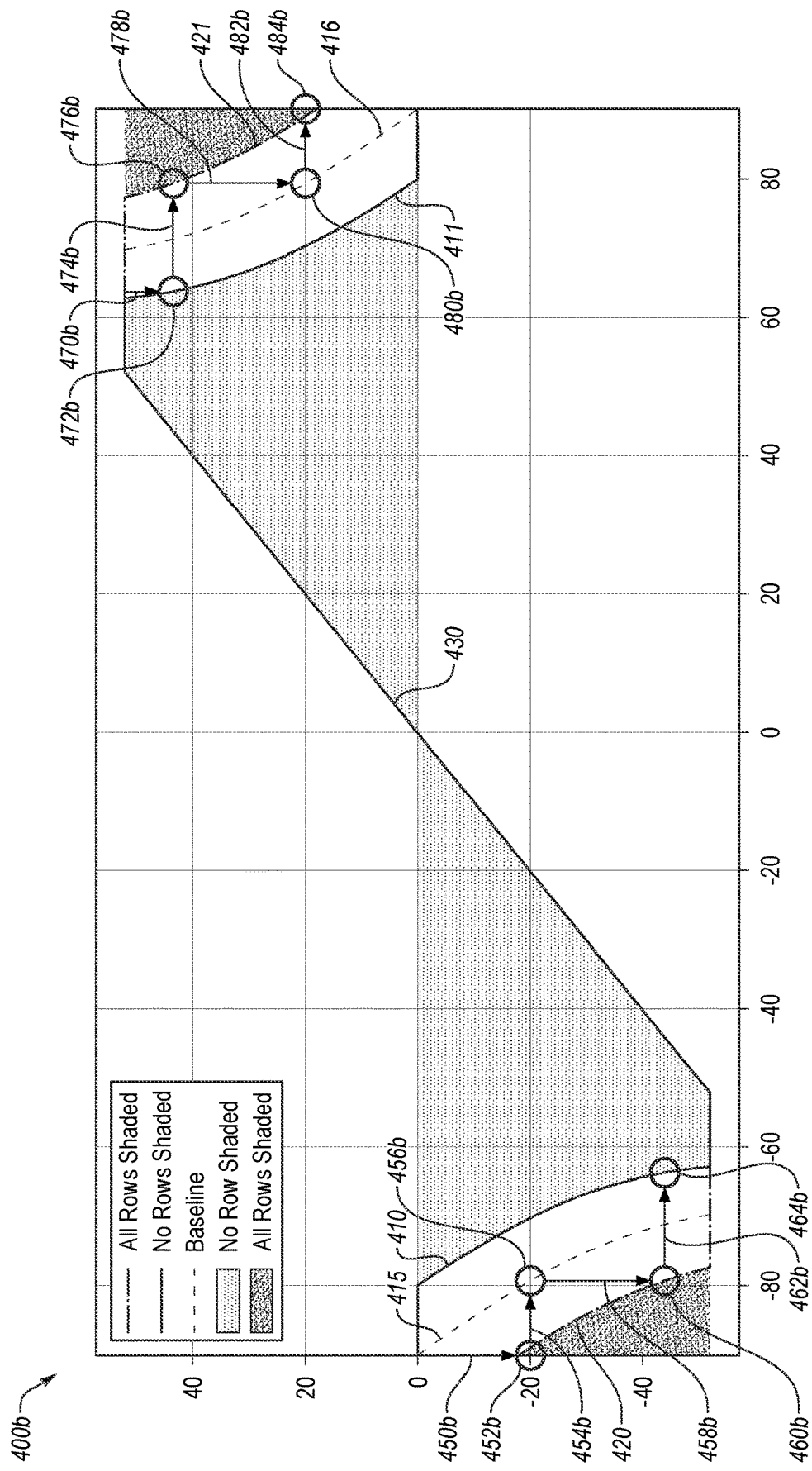

FIGS. 4A and 4B illustrate example plots 400*a* and 400*b* of solar panel orientations relative to solar angle over a day, in accordance with one or more embodiments of the present disclosure. The plot 400*a* illustrates an embodiment in which the solar panels are held in a given orientation to detect the transition from shaded to full sun multiple times, and the plot 400*b* illustrates an embodiment in which the solar panels are held in a given orientation to detect the transition from shaded to full sun a single time. The plots 400*a* and 400*b* may depict solar angle changes throughout the day on the x-axis and an orientation of the solar panels as an angle relative to horizontal on the y-axis.

The plot 400*a* may include a line 410 that represents the boundary of a known region in which none of the rows of solar panels are shaded by each other during regions of very low solar angles in the morning hours. The line 411 may represent the boundary of the known region in which none of the rows of solar panels are shaded by each other during regions of very low solar angles in the evening hours. The plot 400*a* includes a line 420 that may represent the boundary of a known region in which all of the rows of solar panels are shaded by each other during regions of very low solar angles, such as in the morning hours. The line 421 may represent the boundary of the known region in which all of the rows of solar panels are shaded by each other during regions of very low solar angles, such as in the evening hours. Some line 415 (for the morning hours) and 416 (for the evening hours) may represent the transition point at which the rows transition from shading each other to not shading each other and may be located between the lines 410/420 for the morning hours, and 411/421 for afternoon hours. The line 430 may represent a typically tracking algorithm orientation where the orientation of the solar panels may be rotated throughout the course of the day to remain normal to the sun.

In some embodiments, the operations described with reference to FIGS. 4A and 4B may facilitate identification of the location of the lines 415/416 and/or the curvature of the lines 415/416. The lines 415/416 may represent a baseline that is followed as the backtracking curve to avoid shading between rows of solar panels. In some embodiments, the lines 415/416 may be unique to a given row or set of rows, or may be the same for an entire site of solar panels. In some embodiments, the generation of the lines 415/416 (when personalized) may be based on the energy generation of a next row over in one direction for the morning hours and the next row over in the other direction for the afternoon hours. In some embodiments for row-specific backtracking algorithms, different rows may be determined at different times such that one row or set of rows at one end of an array of rows is determined first such that the shadow it casts is not modified. After the first row or set of rows is set, the next row or set of rows may be determined next, and so on in a wave across the array of rows. In these and other embodiments, the morning backtracking curve may be determined and proceed in a wave of determining backtracking curves from one end of the array, and the afternoon backtracking curve may be determined and proceed in a wave from the opposite end of the array.

At an operation 450*a*, the rows of solar panels may be moved to a first orientation at the point 452*a* in which all of the rows are known to be shaded. In the operation of the arrow 454*a*, the rows of solar panels may be held in the first orientation of the point 452*a* until the sun has reached an angle at which the first orientation is known to have none of the rows shaded as indicated by the point 456*a*. Additionally or alternatively, the row of solar panels may be held in the first orientation for a set amount of time, such as until a set amount of electricity generation is achieved, or some other metric. After reaching the point 456*a* in which none of the rows are shaded (or some other metric is reached), the orientation of the rows may be transitioned (as indicated by the arrow 458*a*) to a second orientation in which all of the rows are shaded at a point 460*a*. The rows of solar panels may be held in the second orientation (as indicated by the arrow 462a) until the sun has reached an angle at which the second orientation is known to have none of the rows shaded as indicated by the point 464a (or until some other metric is reached).

By holding the orientation of the rows of solar panels in place while the sun moves to cause a shaded and an unshaded condition and the transition therebetween, the electrical generation may be identified as the transition point on the line 415 based on a knee in the curve of electrical generation. As illustrated in FIG. 4A, two points may be identified in the morning hours along the arrows 454a and 462a. An example of the identification of such a knee is described in greater detail with reference to FIGS. 5 and 6.

A similar or comparable approach may be undertaken in the evening hours. For example, at the point 470a (e.g., when all the rows are known to be without shade), the orientation may be held as indicated by the arrow 472a until the point 474a where it is known that all of the rows are shaded (or some other metric is reached). The orientation of the rows of solar panels may then be transitioned (as indicated by the arrow 476a) to the point 478a where it is known that all of the rows are without shade. The orientation of the rows may then be held in place (as indicated by the arrow 480a) until the point 482a in which it is known that all the rows are shaded (or some other metric is reached). Doing so may facilitate the identification of the points on the line 416 by the knees in the curve of energy generation.

In some embodiments, the orientation at which the rows of solar panels may be held in place may be changed on different days. For example, during a learning phase in which the system is learning the lines 415/416, the orientations may be changed to facilitate identification of points on the lines 415/416 (e.g., the orientation may be held at the point 452a on one day, and at a point of a few more degrees away from horizontal on another day). In some embodiments, the same orientation at the point 452a may be used multiple days (e.g., multiple consecutive days) to verify the accuracy of the point(s) on the line 415/416 and/or otherwise to facilitate or increase confidence in the point on the line 415/416.

In some embodiments, the lines 415 and/or 416 may be known curves of a particular shape that may be located in the region between the lines 410/420 and 411/421 using a single point (or multiple points) within the region. Additionally or alternatively, the lines 415 and/or 416 may be solved for by detecting one or multiple points along the lines 415 and/or 416 over one or multiple days by changing the orientation corresponding to the points 452a, 460a, 470a, and/or 478a. By using different points over multiple days, a sufficient number of points (such as four, five, six, eight, ten, etc.) may be obtained.

The plot 400b of FIG. 4B may be similar or comparable to the plot 400a of FIG. 4A, including the lines 410, 411, 415, 416, 420, 421, and 430. As illustrated in FIG. 4B, at an operation 450b, the rows of solar panels may be moved to a first orientation at the point 452b in which some or all of the rows are known to be shaded. In the operation 454b, the rows of solar panels may be held in the first orientation of the point 452b until an intermediate point 456b is reached. The point 456b may correspond to an estimation of the location of the line 415, which may be a mid-point between the lines 410 and 420, or any other intermediate point or location between the line 410 and 420. After reaching the intermediate point 456a, the orientation of the rows may be transitioned (as indicated by the arrow 458b) to a second orientation in which some or all of the rows are shaded at a point 460b. The one or more rows of solar panels may be held in the second orientation (as indicated by the arrow 462b) until the sun has reached an angle at which the second orientation is known to have none of the rows shaded as indicated by the point 464b (or until some other metric is reached). A similar or comparable approach may be undertaken in the evening hours. For example, at an action 470b, the one or more rows of solar panels may be moved to an orientation at a point 472b in which none of the rows are shaded. The orientation of the point 472b may be held as indicated by the arrow 474b until the point 476b where it is known that some or all of the rows are shaded. The orientation of the rows of solar panels may then be transitioned (as indicated by the arrow 478b) to an intermediate point 480b. The point 480b may correspond to an estimation of the location of the line 416, a mid-point between the lines 411 and 421, or any other intermediate point or location between the line 411 and 421. The orientation of the one or more rows may then be held in place (as indicated by the arrow 482b) until the point 484b in which it is known that some or all the rows are shaded (or some other metric is reached). Doing so may facilitate the identification of the points on the line 416 by the knees in the curve of energy generation.

In the embodiment illustrated in FIG. 4B, a single point on the line 415 may be identified during the holding of the orientation at the arrow 462b and a single point on the line 416 may be identified during the holding of the orientation at the arrow 474b. In these and other embodiments, the single point may be used to locate the lines 415/416 between the lines 410/420 and 411/421, respectively. By using orientations when there is more irradiance to locate the lines 415/416, the lines 415/416 may be positioned based on points closer to when a larger impact in energy production is encountered (e.g., due to increased energy produced with more irradiance).

Modifications, additions, or omissions may be made to the plots 400a and/or 400b without departing from the scope of the present disclosure. For example, the plots 400a and/or 400b may include holding orientations at any position and any number of times during the morning and/or afternoon hours.

Figure 5:
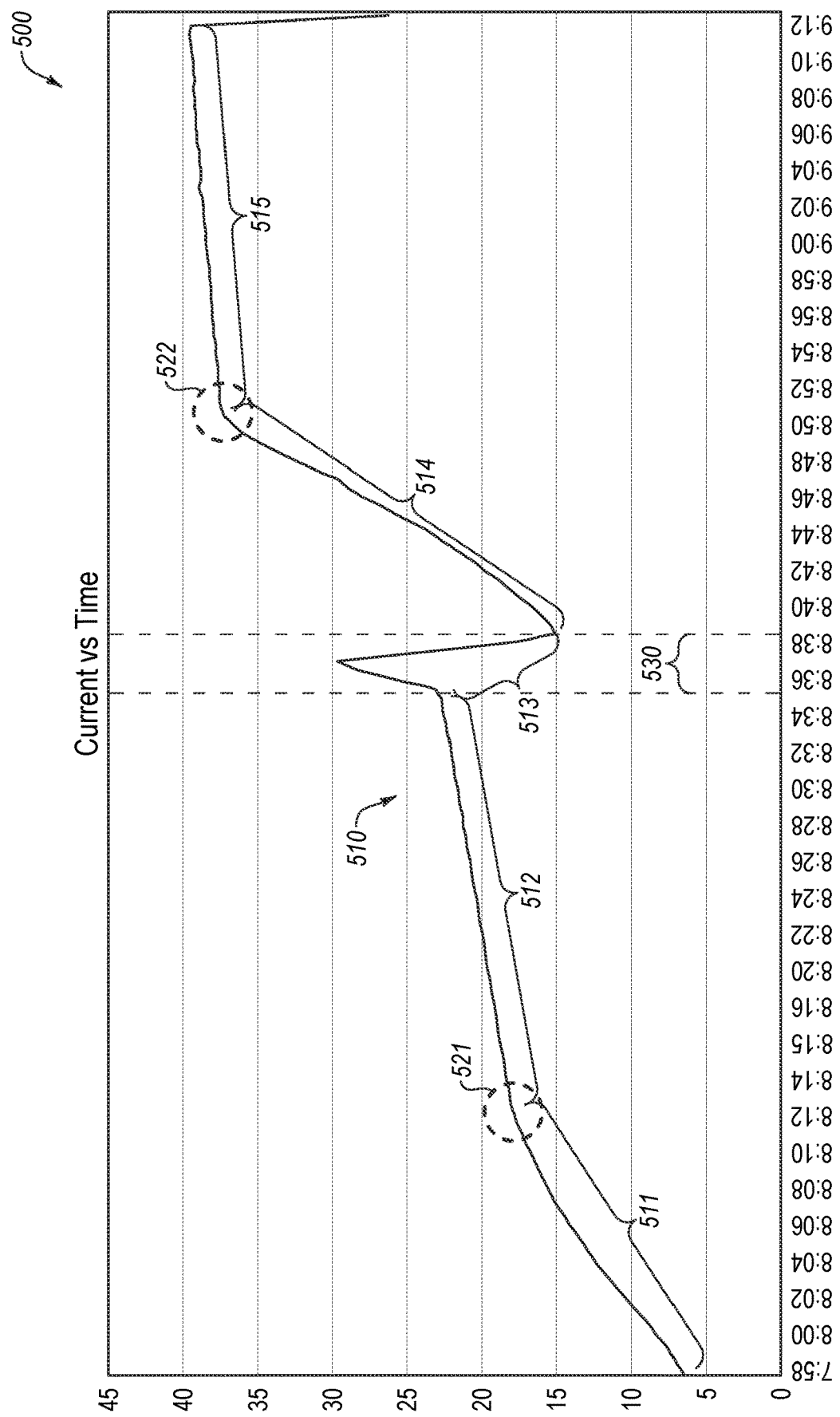
FIG. 5 illustrates an example plot of electrical current generation over time.

FIG. 5 illustrates an example plot 500 of electrical current generation over time as generated by one or more solar power generating devices (such as one or more rows of solar panels), in accordance with one or more embodiments of the present disclosure. For example, the plot 500 may include a line 510 that may correspond to the series of actions corresponding to the points and arrows 450a-464a depicted in the morning hours in FIG. 4A. The line 510 may include a first portion 511, a second portion 512, a third portion 514, a fourth portion 514, and a fifth portion 515. The plot 500 may include a region 530 in which the solar power generating device may be moved.

As illustrated in FIG. 5, the first portion 511 may correspond to a period in which the solar power generating device is shaded by an adjacent row. The second portion 512 may correspond to a period in which the rate of change in energy production is decreased as the solar power generating device is no longer shaded (e.g., the rate of change may initially be higher as the increase in power generation may be caused by a combination of the solar irradiance increasing and the shade decreasing, while after the shade is gone, the rate of change may be lower due to the increase being caused by the solar irradiance change). For example, the combination of the first and second portions 511 and 512 may correspond to the arrow 454a of FIG. 4A in which the orientation of the row of solar panels may be held in place while the sun moves to cause the shadow of the adjacent row of solar panels to move across and eventually off of the row of solar panels.

The third portion 513 may correspond to a period in which the solar power generating device is moved to another orientation in which some or all of the rows are shaded. For example, the third portion 513 may correspond to the arrow 458a in which additional solar power is generated as the row of solar panels approach the orientation of normal to the sun, and then the solar production may decrease rapidly as the rows are shaded. The fourth portion 514 may correspond to a period in which the solar power generating device is shaded by an adjacent row. The fifth portion 515 may correspond to a period in which the rate of change in energy production is decreased as the solar power generating device is no longer shaded. For example, the combination of the fourth and fifth portions 514 and 515 may correspond to the arrow 462a of FIG. 4A in which the orientation of the row of solar panels may be held in place while the sun moves to cause the shadow of the adjacent row of solar panels to move across and eventually off of the row of solar panels.

As illustrated in FIG. 5, the line 510 may be used to detect knees in the plot of energy generation, such as the knees 521 and 522. The knees 521 and 522 may correspond to transitions in the rate of change of energy production. In these and other embodiments, any known technique may be used for identifying the inflection point or knees 521 and 522, such as identifying when the rate of change shifts, identifying the intersection of lines fit to the different portions, etc. In some embodiments, when identifying the knees, the region 530 may be excluded and may act as a divider such that the first portion 511 and second portions 512 may be analyzed together to detect the knee 521 and the fourth portion 514 and fifth portion 515 may be analyzed together to detect the knee 522.

Based on the detected knees 521 and/or 522, the backtracking curve may be located or otherwise identified. For example, the detected knees 521 and/or 522 may be used as points on the backtracking curve, or the backtracking curve may have a known shape and the knees 521 and/or 522 may be used to place the curve of known shape in the proper place. In some embodiments, the time of day identified in FIG. 5 corresponding to the knees 521 and/or 522 may be correlated with a given solar angle based on the day of the year when the readings were taken and/or a known solar position at the corresponding time of day.

Modifications, additions, or omissions may be made to the plot 500 without departing from the scope of the present disclosure. For example, the plot 500 may include portions for detecting one knee, two knees, three knees, or any other number of knees.

Figure 6:
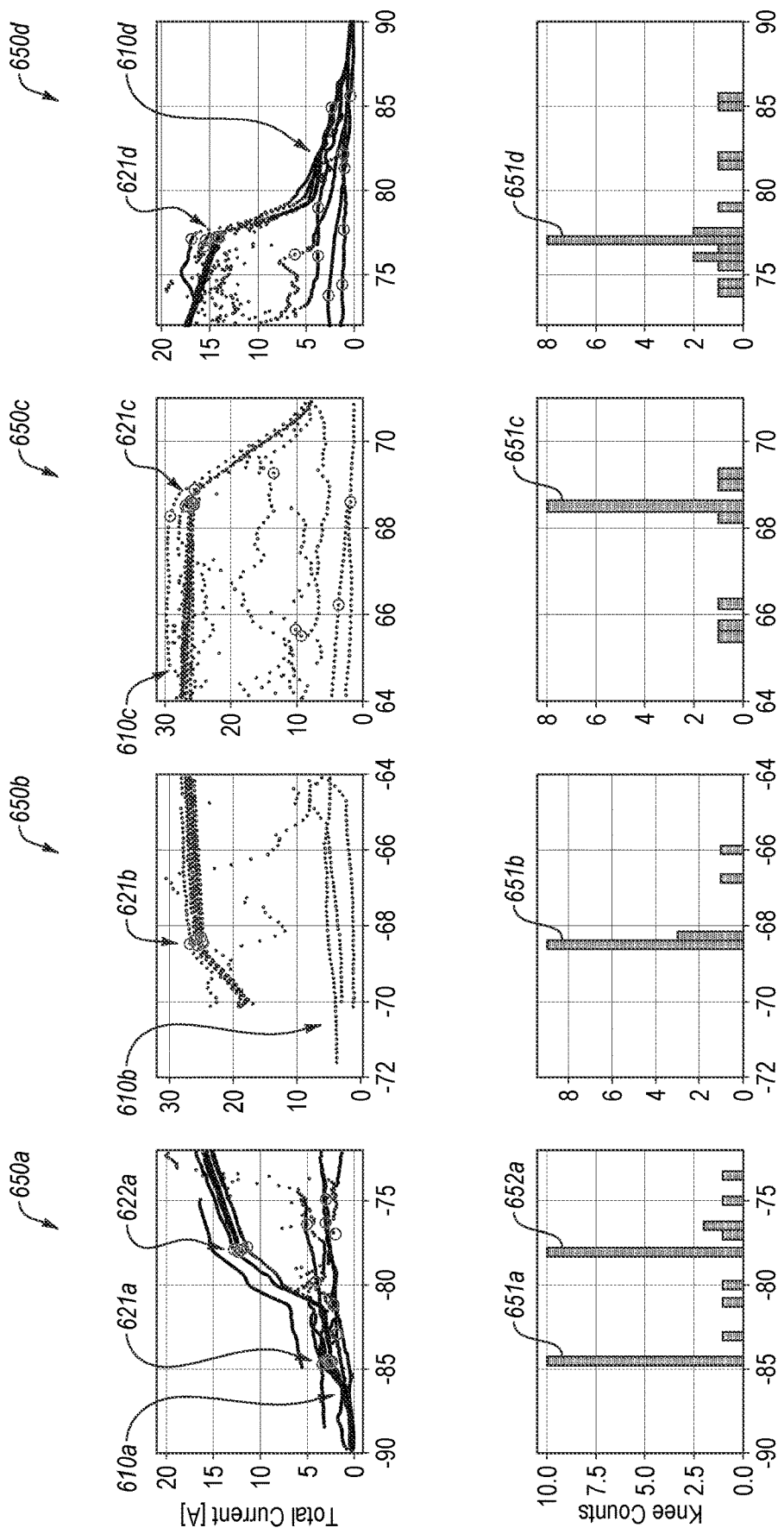
FIG. 6 illustrates a series of example plots in which knees are detected, and corresponding histograms.

FIG. 6 illustrates a series of example plots 650 in which knees 621 and 622 are detected, and illustrates corresponding histograms, in accordance with one or more embodiments of the present disclosure. The plots 650 may be similar or comparable to the plot 500 of FIG. 5, with multiple days' traces 610 with corresponding candidate knees 621/622 overlaid on a single plot 650. Each of the candidate knees may be represented by a hollow circle on the plots 650. The plots 650 may depict the electrical current generated vs. a corresponding solar angle (e.g., the data of the different days may be normalized based on the solar angle rather than time of day). Below the plots 650 are corresponding histograms of how many days had knees identified as corresponding to given solar angles. The plot 650a may represent an early morning set of traces (such as those obtained during the arrow 454a of FIG. 4A), the plot 650b may represent a later morning set of traces (such as those obtained during the arrow 462a), the plot 650c may represent an early evening set of traces (such as those obtained during the arrow 472a), and the plot 650d may represent a later evening set of traces (such as those obtained during the arrow 480a). The plots 650 may facilitate identification of a corresponding flexion point for each of the plots 650, the flexion point corresponding to the solar angle at which the row of panels shifts from a shaded to a full-sun condition (e.g., a point on the backtracking curve).

With reference to the plot 650a, the traces 610a may have a first series of knees 621a of the candidate knees identified when the sun is very low (with a corresponding first peak 651a in the first histogram) and a second series of knees 622a of the candidate knees identified later in the morning (with a corresponding second peak 652a in the histogram). In these and other embodiments, a controller may identify the two peaks and may wait for additional data of candidate knees of additional days to identify which of the peaks 651a and/or 652a corresponds to the actual inflection point in shading. Additionally or alternatively, the controller may exclude certain solar angles as corresponding to the actual knee, such as those when the sun is low enough in the sky that changes in solar power may be based on a transition from full shade to partial shade, from light from below adjacent rows, etc. Additionally or alternatively, the controller may exclude certain knees below a certain amount of energy generation. For example, based on the peak 651a of the histogram being associated with such a low solar angle (such as nearly horizontal at negative eighty-five degrees from vertical) or the energy generation being below a threshold value (e.g., five amps of total current), the controller may exclude the peak 651a and recognize the peak 652a as the flexion point associated with the candidate knees of the plot 650a. For example, the flexion point may represent a point that is to be on the backtracking curve.

With reference to the plot 650b, the traces 610b may have a series of knees 621b of the candidate knees identified. In these and other embodiments, a controller may identify the peak 651b in the histogram as a flexion point. With reference to the plot 650c, the traces 610c may have a series of knees 621c of the candidate knees identified. In these and other embodiments, a controller may identify the peak 651c in the histogram as a flexion point. With reference to the plot 650d, the traces 610d may have a series of knees 621d of the candidate knees identified. In these and other embodiments, a controller may identify the peak 651d in the histogram as a flexion point.

By utilizing candidate knees from multiple days to facilitate identifying the flexion point, the potential of a candidate knee not corresponding to the flexion point may be avoided. For example, the traces 610c may include multiple days of cloudy or intermittent cloudy conditions with variations in solar power generation that results in multiple hits in the histogram, but the peak 651c may be much larger than the various other candidate knees identified.

In some embodiments, in detecting whether or not the peaks in the histograms are flexion points, the controller may utilize one or more metrics, such as the highest peak, a minimum number of hits, the next highest peak being lower than the highest peak by a threshold amount, a ratio of the highest peak and the next highest peak being above a threshold, etc. and/or any combinations thereof.

Modifications, additions, or omissions may be made to the plots 650 and/or associated histograms without departing from the scope of the present disclosure. For example, the plots 650 and/or associated histograms may include any number of traces, detect one or more knees in each of the traces, etc.

Figure 7:
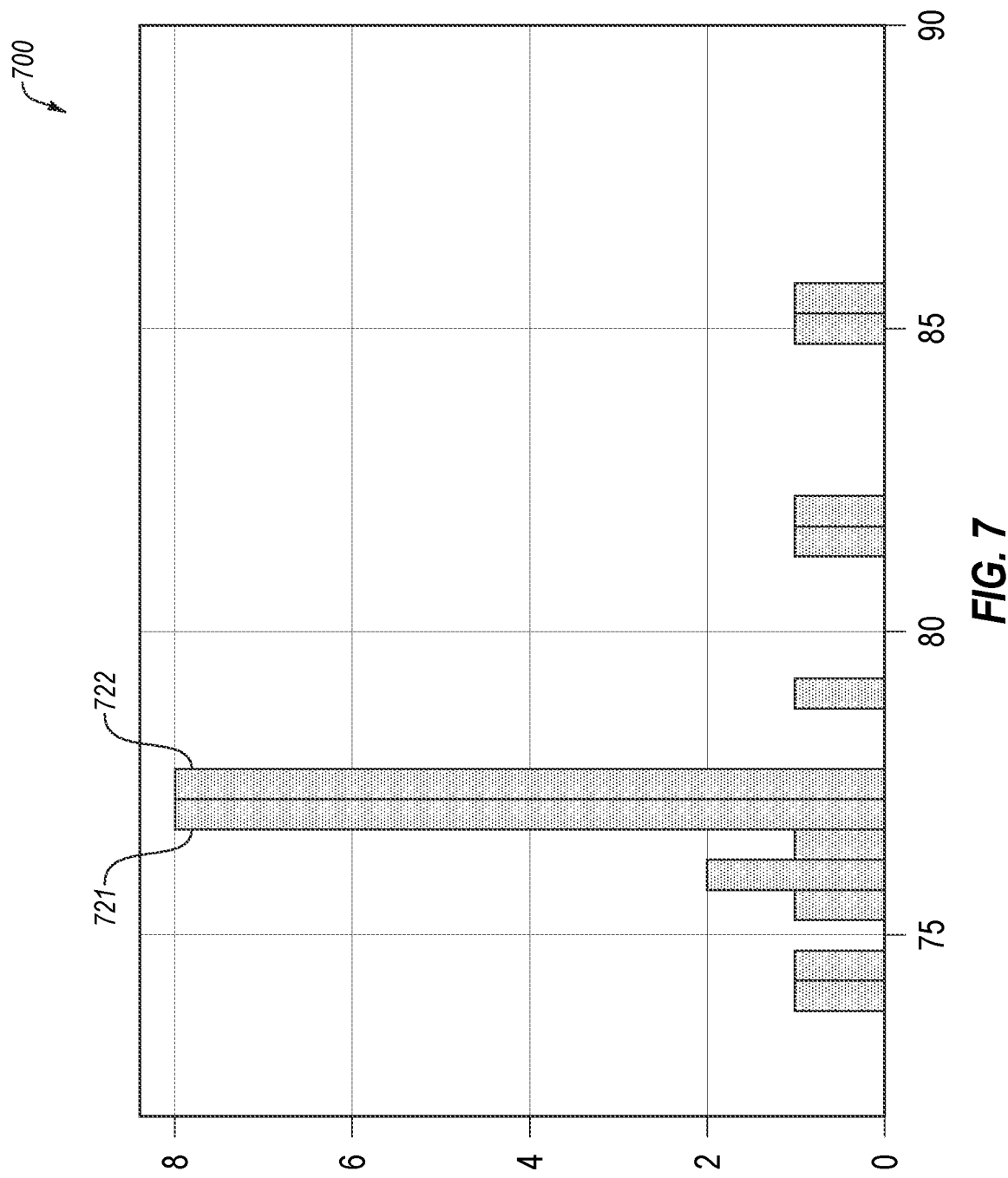
FIG. 7 illustrates an example histogram of knee location.

FIG. 7 illustrates an example histogram 700 of knee location, in accordance with one or more embodiments of the present disclosure. As illustrated in FIG. 7, in some circumstances if the flexion point falls between two solar angles, the histogram 700 may depict two peaks 721 and 722.

In some embodiments, if multiple peaks in a histogram are identified by a controller, such as the peaks 721 and 722 in the histogram 700, the controller may be configured to down-sample the data. For example, the controller may discard data from every other potential value in the histogram (such as every odd number if the histogram is based on whole numbers). After down-sampling the histogram, the controller may check for a single peak. In the embodiment, illustrated in FIG. 7, such an approach may yield a single peak.

In some embodiments, the controller may be configured to down-sample the data of the histogram 700, and identify a first flexion point and then analyze the removed data in the down-sampling to identify a second flexion point. For example, the even values may be used to determine a first flexion point, followed by the odd values being used to determine a second flexion point. In these and other embodiments, the multiple flexion points may be compared to each other. If they are within a threshold value of each other, one of the two (or an average of the two) may be identified as the final flexion point. In such an embodiment, the histogram 700 may yield a final flexion point, while the plot 650a and associated histogram may not yield a final flexion point, and as such, additional data may be sought.

Modifications, additions, or omissions may be made to the histogram 700 without departing from the scope of the present disclosure. For example, the histogram 700 may include any number of peaks at any number of locations.

Figure 8:
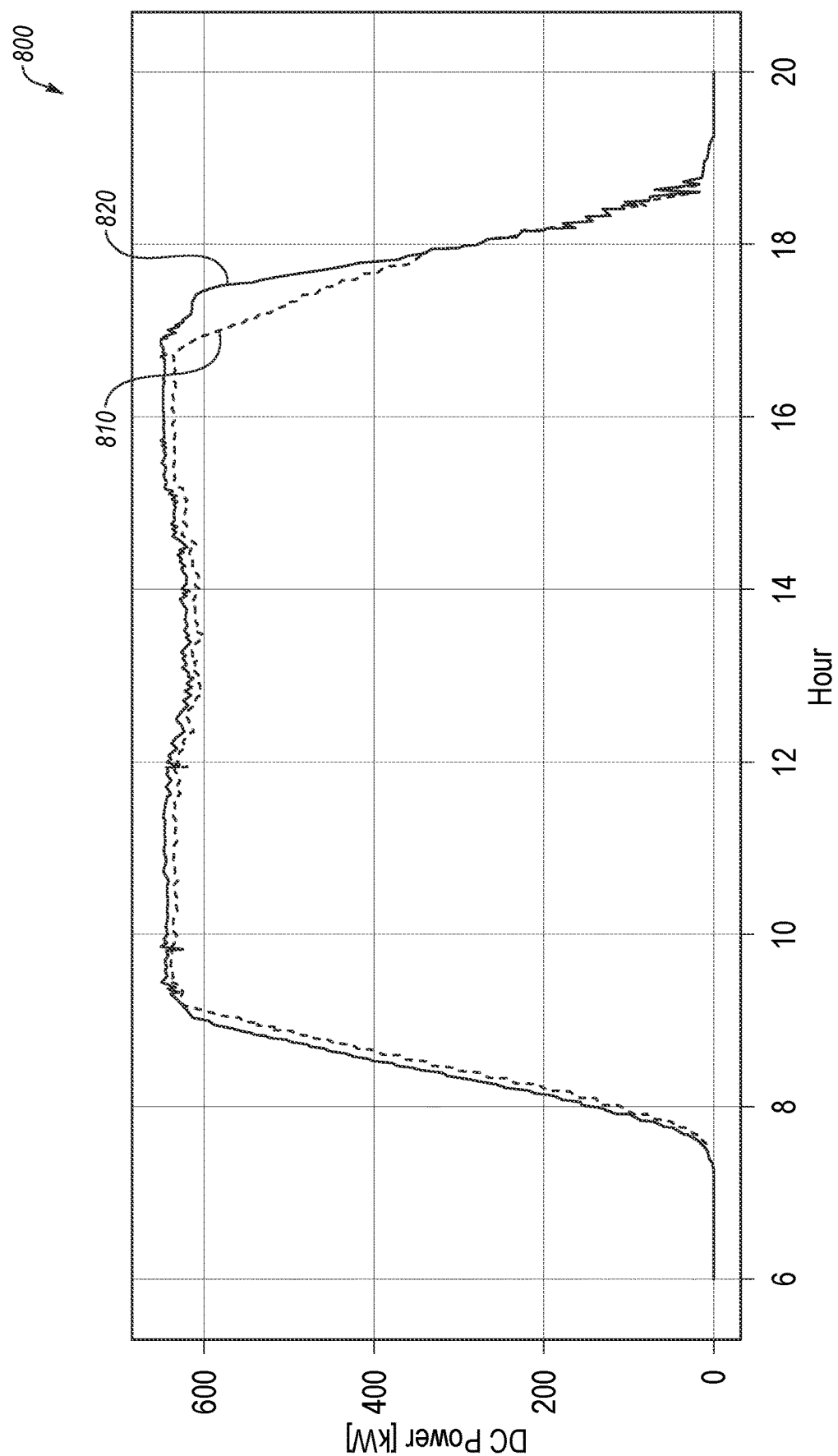
FIG. 8 illustrates another example plot of electrical current generation over time.

FIG. 8 illustrates another example plot 800 of electrical current generation over time, in accordance with one or more embodiments of the present disclosure. The plot 800 may depict experimental results depicting a first trace 810 of power generation using an estimated backtracking curve and typical tracking algorithm, and depicting a second trace 820 of power generation using a backtracking curve based on embodiments of the present disclosure and typical tracking algorithm.

As illustrated in the plot 800, the embodiments of the present disclosure may provide increases in energy during the backtracking portions of solar energy generation. For example, one or more embodiments of the present disclosure may facilitate ending backtracking slightly earlier in the morning and starting slightly later in the evening. As another example, the backtracking curve may be positioned, sloped, etc. or otherwise placed in a way that generates additional energy in the backtracking portions of the day.

Figure 9A:
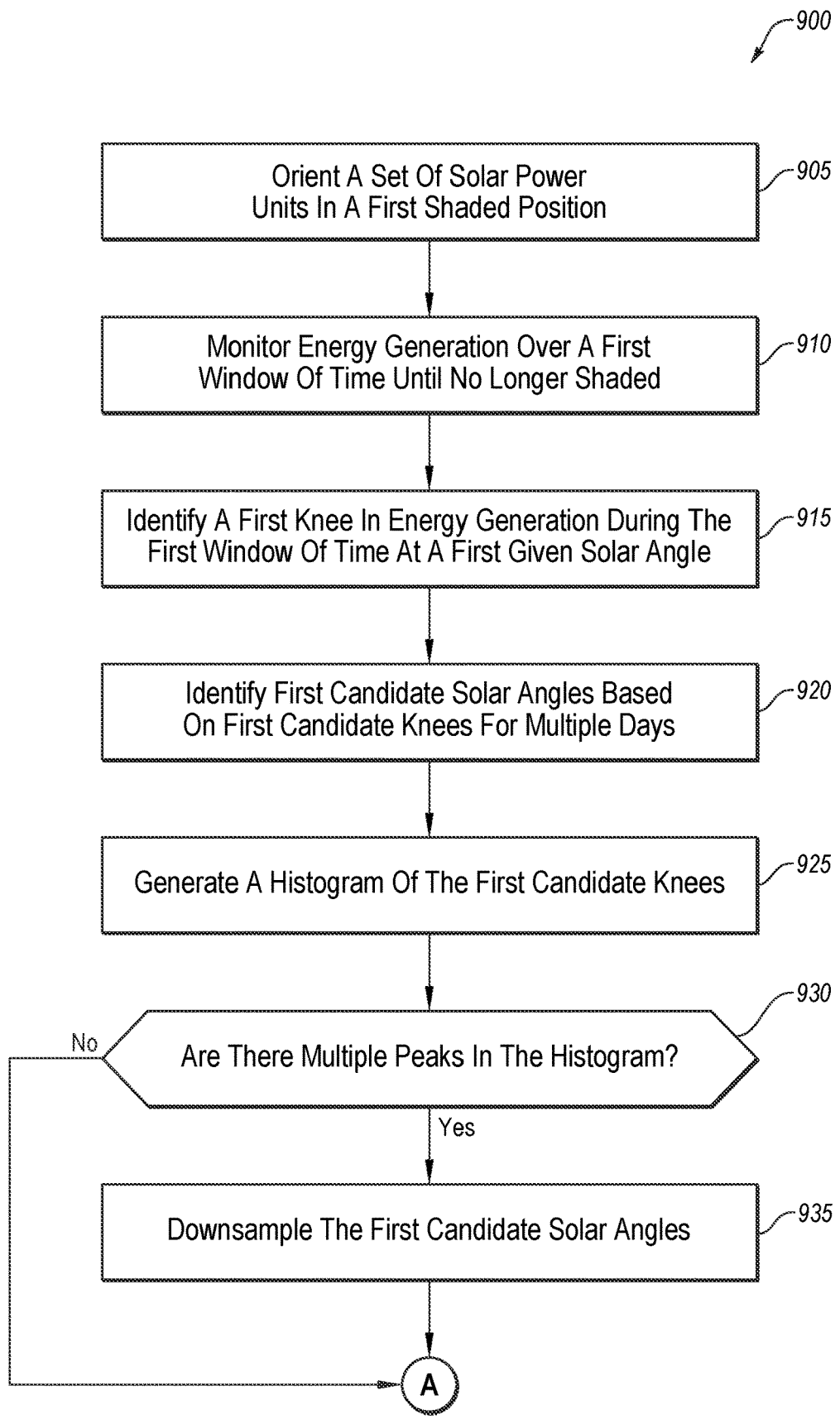
FIGS. 9A and 9B illustrate an example flow diagram of a method of generating and/or operating with a backtracking curve.
Figure 9B:
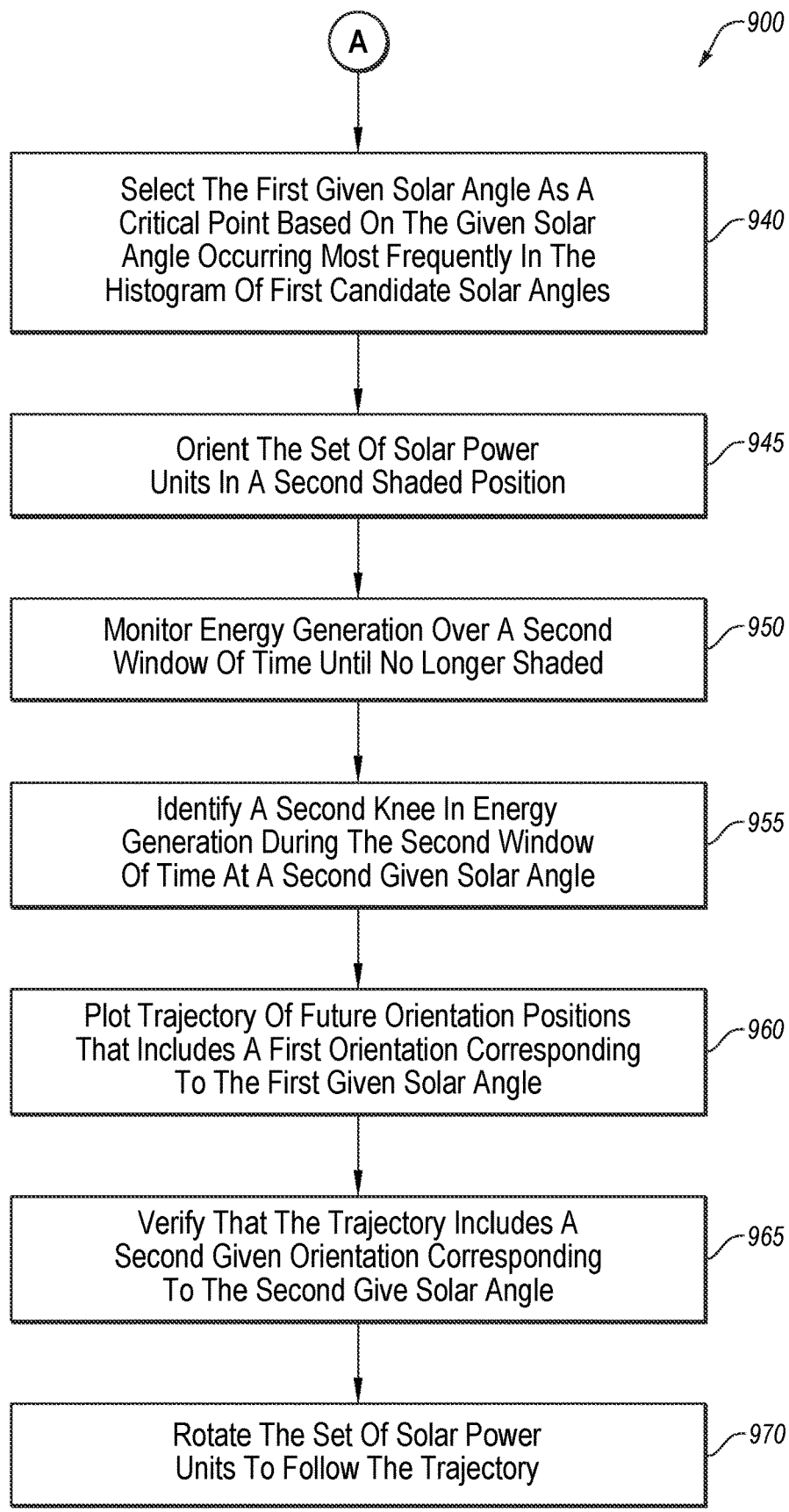

FIGS. 9A and 9B illustrate an example flow diagram of a method 900 of generating and/or operating with a backtracking curve, in accordance with one or more embodiments of the present disclosure. One or more operations of the method 900 may be performed by a system or device, or combinations thereof, such as the system 100 of FIG. 1. Although illustrated as discrete blocks, various blocks of the method 900 may be divided into additional blocks, combined into fewer blocks, or eliminated, depending on the desired implementation.

At block 905, a set of solar power units may be oriented in a first shaded position. For example, a row of solar power units may be placed in an orientation in which all of the rows are known to be shaded. For example, a controller may store a known solar angle at which all of the rows of solar power units are shaded.

At block 910, energy generation of the set of solar power units may be monitored over a first window of time until the set of solar power units are no longer shaded. For example, the orientation of the block 905 may be held in place during the first window of time until a solar angle arrives at which none of the rows are shaded. For example, a controller may store a known solar angle at which none of the rows are shaded by adjacent rows of solar panels. In some embodiments, the first window of time may be based on other metrics, such as a target energy generation amount, a set period of time, or any other metric.

At block 915, a first knee in the energy generation during the first window of time may be identified. In these and other embodiments, the location of the first knee may correspond to a given time of day and/or a particular solar angle. The first knee may be identified by identifying the location at which the rate of change of energy generation has a significant shift, such as illustrated and described with reference to FIG. 5.

At block 920, first candidate solar angles may be identified based on first candidate knees for multiple days. For example, for multiple days (such as one week, two weeks, twenty days, a month, etc.), each day may have a corresponding candidate knee in energy generation with corresponding solar angle identified during the first window of time for that day, and the candidate solar angles may be placed in a set of the first candidate solar angles.

At block 925, a histogram may be generated of the first candidate knees. For example, the histogram may depict the frequency with which various solar angles are identified as the candidate solar angle. In some embodiments, a graphical histogram may or may not be used, and a hit counter or other counting approach may be used to quantify a number of times solar angles were identified within the first candidate solar angles.

At block 930, a determination may be made whether there are multiple peaks in the histogram. For example, the highest peaks may be compared to each other. If multiple points are within a threshold number of hits or ratio of each other, the two corresponding points in the histogram may be counted as multiple peaks. If it is determined that there are multiple peaks, the method 900 may proceed to the block 935. If it is determined that there are not multiple peaks, the method 900 may proceed to the block 940.

At block 935, the first candidate solar angles may be down-sampled. For example, one half (or two thirds, etc.) of the data may be discarded, such as every other potential value in the histogram (e.g., all the odd numbers are discarded and only the even number of sola angles are considered). Such an approach may facilitate addressing adjacent peaks in the histogram as described with reference to FIG. 7.

At block 940, the first given solar angle may be selected as a flexion point based on the given solar angle occurring most frequently in the histogram of the first candidate solar angles. For example, the flexion point (e.g., the point to be placed on the backtracking curve) may be identified as the point that occurs most frequently in the histogram. As another example, the flexion point may be identified based on the peak in the histogram corresponding to the first given solar angle being higher than the next highest peak by a threshold amount and having a minimum number of hits.

At block 945, the set of solar power units may be oriented in a second shaded position. For example, the orientation of the rows of solar panels may be moved to a position in which all of the rows are shaded. In some embodiments, the controller may store a given orientation which is known to result in all rows being shaded. The block 945 may be similar or comparable to the block 905 but at a second shaded position.

At block 950, energy generation may be monitored over a second window of time until the solar power units are no longer shaded. The block 950 may be similar or comparable to the block 905, but conducted over the second window of time while holding the orientation of the block 945.

At block 955, a second knee in energy generation during the second window of time may be identified. For example, the second knee may correspond to a given point in time with a corresponding second given solar angle. The block 955 may be similar or comparable to the block 915, but for the second knee during the second window of time.

At block 960, a trajectory of future orientation positions may be plotted that includes a first orientation corresponding to the first given solar angle. For example, a backtracking curve may be plotted as the trajectory of future orientation positions. At least one of the orientations may be identified as the first orientation corresponding to the first given solar angle. For example, the backtracking curve may include a known shape or profile, but may be located at an unknown position between the known all-shaded domain and no-shade domain. The first given solar angle may operate to locate the backtracking curve between such domains. In some embodiments, the backtracking curve may be constructed based on the flexion points identified over multiple iterations and/or multiple days such that a threshold number of flexion points are identified to construct the trajectory of future orientation positions.

At block 965, a verification may be performed that the trajectory of the block 960 includes a second given orientation corresponding to the second given solar angle of the block 955. For example, when plotting the trajectory at the block 960, the second orientation and the second given solar angle may be an additional flexion point in the backtracking curve. As another example, the backtracking curve may be located between the known all-shaded domain and no-shade domain based on the flexion point associated with the first given solar angle, and the verification may check that the second given orientation corresponding to the second given solar angle falls on or within a threshold distance of the backtracking curve as located based on the flexion point associated with the first given solar angle.

At block 970, the set of solar power units may be rotated to follow the trajectory of the block 960. For example, after the backtracking curve has been determined as the trajectory of the block 960, a normal or typical tracking algorithm may be overridden or replaced by the trajectory of the block 960 during solar angles at which adjacent rows of solar panels are shaded such that the trajectory of orientations may avoid or reduce such shade.

Modifications, additions, or omissions may be made to the method 900 without departing from the scope of the disclosure. For example, the operations of the method 900 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 10A:
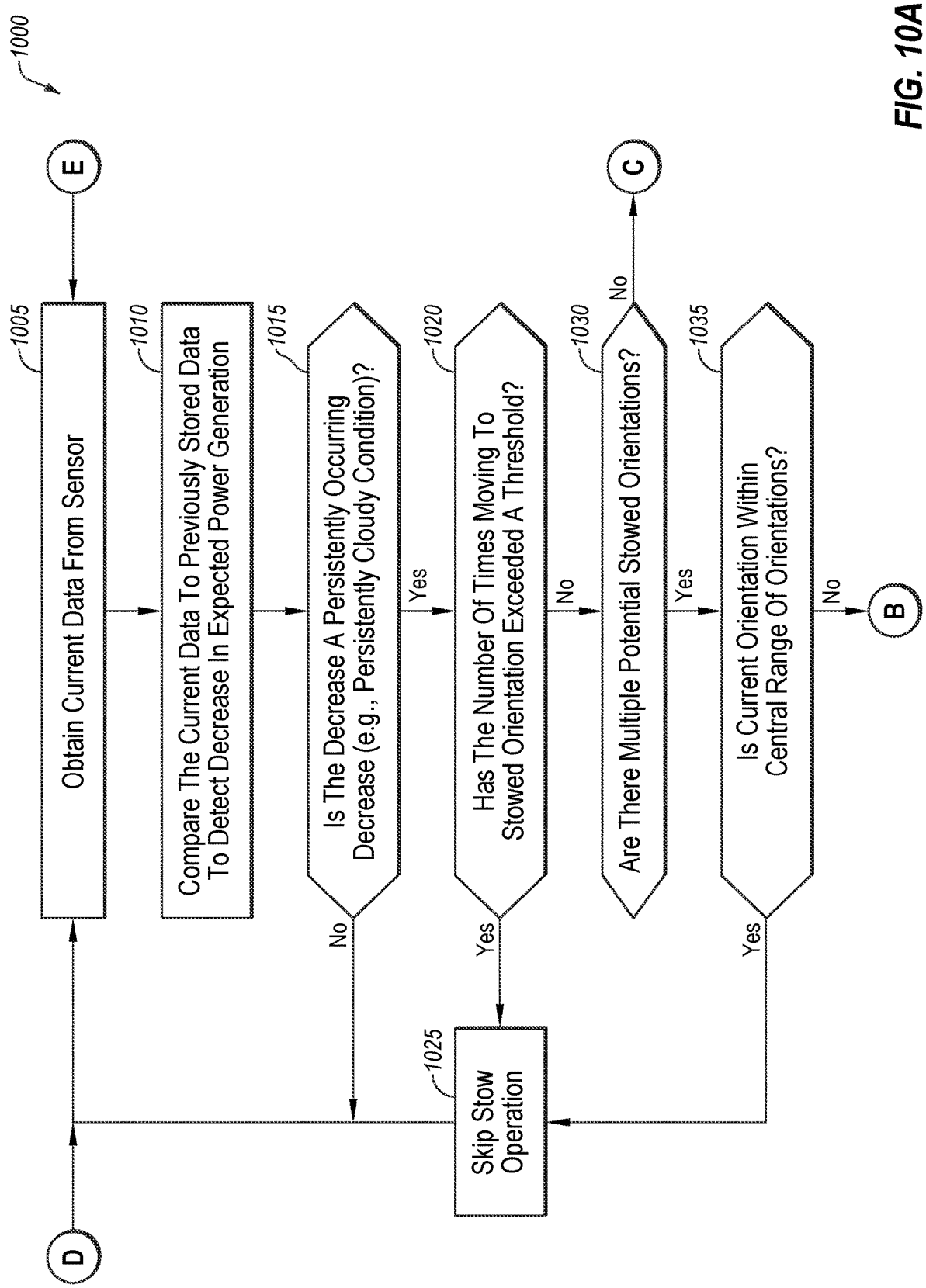
FIGS. 10A and 10B illustrate an example flow diagram of a method of operating a solar power generating device with persistent decreases in energy generation.
Figure 10B:
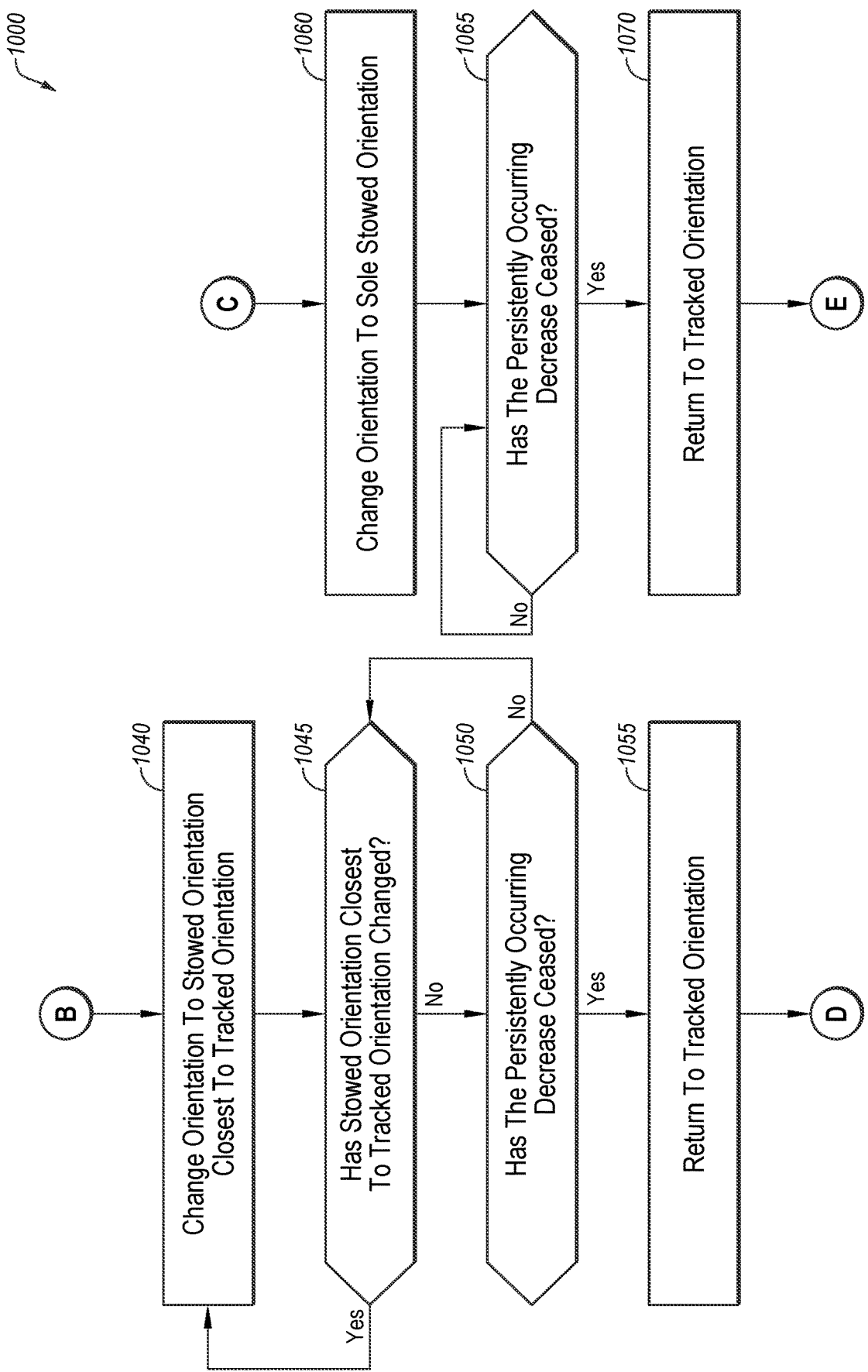

FIGS. 10A and 10B illustrate an example flow diagram of a method 1000 of operating a solar power generating device with persistent decreases in energy generation, in accordance with one or more embodiments of the present disclosure. For example, a solar power generating device may be moved to a stowed orientation if a persistently cloudy condition exists. One or more operations of the method 1000 may be performed by a system or device, or combinations thereof, such as the system 100 of FIG. 1. Although illustrated as discrete blocks, various blocks of the method 1000 may be divided into additional blocks, combined into fewer blocks, or eliminated, depending on the desired implementation.

At block 1005, current data from a sensor may be obtained. For example, a controller may obtain data from the sensor and/or may monitor data related to performance of a solar power generating device. Such sensors may include a sensor to monitor irradiance, a sensor to monitor amount of electrical power generation, etc. In these and other embodiments, the sensor may be a sensor that is already a component of a solar power generating site.

At block 1010, the current data from the sensor may be compared to previously stored data to detect a decrease in expected power generation. For example, a trend of historic electrical power generation may be monitored and/or compared to the current data to observe whether or a not a dip in the expected power generation or actual power generation is observed. In some embodiments, the detection of a decrease in expected power generation may be based on the decrease in power, irradiation, etc. of sensor data dropping below a threshold amount of expected power generation.

At block 1015, a determination may be made whether the decrease detected at block 1010 is a persistently occurring decrease (e.g., whether the condition is a persistently cloudy condition). Such a determination may be based on a duration of the decrease in expected power generation, an amount of the decrease in expected power generation, variations in the data, etc. and/or any other analysis on the sensor data. For example, if the sensor indicates that the expected energy production is low and the data has been consistent (e.g., low production and low variability), the decrease may be designated as persistent. In some embodiments, a decay algorithm may be applied to the data such that recent data is weighted more heavily in detecting a persistently occurring decrease in expected energy generation.

At block 1020, a determination may be made as to whether the solar power generating device has been moved to a stowed orientation a number of times in excess of a threshold. For example, due to the detected presence and/or cessation of persistent decreases in solar power, the solar power generating device may be moved into and/or out of the stowed orientation. If the movement to a stowed orientation has occurred beyond the threshold number of times, such repetition may occur because the day is one in which clouds roll in and out throughout the entire day and so the controller may determine to cause the solar panels to follow the normal tracking algorithm for the remainder of the day. If the number of times has been exceeded, the method 1000 may proceed to the block 1025, if the number of times has not been exceeded, the method 1000 may proceed to the block 1030.

At block 1025, the stow operation may be skipped. For example, rather than repeatedly shifting to the stowed position throughout a given day, the stowed operation may be skipped. In some embodiments, the skipping of the stow operation may be for a single instance, for a set period of time, or for a set number of instances. For example, the block 1025 may include skipping any further stow operations for the remainder of the day.

At block 1030, a determination may be made whether there are multiple potential stowed orientations. For example, the controller configured to control the orientation of the solar power generating device may be configured to select one stow orientation from multiple potential stow orientations, or may have a sole stow orientation. For example, the stow orientations may include −20, −10, −5, 0, 5, 10, and 20 degrees from horizontal as potential stow orientations. If there are multiple potential stowed orientations, the method 1000 may proceed to the block 1035. If there are not multiple potential stowed orientations, the method 1000 may proceed to the block 1060.

At block 1035, a determination may be made whether the current orientation of the solar generating device is within a central range of the multiple potential orientations. For example, if the stow orientations include −20, −10, −5, 0, 5, 10, and 20 degrees from horizontal, and the current orientation is already at −12 degrees from horizontal, the determination may indicate that the current orientation is within the central range of the multiple potential orientations. The current orientation may be based off of a tracking algorithm. In some embodiments, the central range may include between any of the potential orientations (e.g., between −20 and 20) or a more limited range (e.g., between −10 and 10, or between −5 and 5). If the current orientation is within the central range (e.g., the current orientation is −12 degrees), the method 1000 may proceed to the block 1025 where the stow operation is skipped such that the controller may continue to follow a normal tracking algorithm across orientations that are close to horizontal and the stow orientation. If the current orientation is not within the central range (e.g., the current orientation is −35 degrees), the method 1000 may proceed to the block 1040.

At block 1040, the orientation may be changed to the stowed orientation that is closest to the tracked orientation. Following the example above, if the current orientation is −35 degrees, the orientation may be changed to the stow orientation of −20 degrees from horizontal. By selecting the stow orientation closest to the current tracked orientation, if the persistent condition ceases, the solar power generating device has a shorter distance to travel to return to the tracked orientation from the stowed orientation.

At block 1045, a determination may be made whether the stowed orientation closest to the tracked orientation has changed. If the stowed orientation closest to the tracked orientation has changed, the method 1000 may return to the block 1040 to change the orientation to the closest stowed orientation to the tracked orientation. Continuing the example above, if the tracking algorithm identifies a current tracked orientation as −12 degrees and the current stowed orientation is the −20 degrees stowed orientation, the controller may change the current stowed orientation from −20 degrees to −10 degrees. By doing so, the solar power generating device may have a shorter distance to travel to return to the tracked orientation from the stowed orientation. If the stowed orientation closest to the tracked orientation has not changed, the method 1000 may proceed to the block 1050.

At block 1050, a determination may be made whether the persistently occurring decrease has ceased. For example, if the persistently occurring decrease was due to cloud cover and the clouds clear out, the determination may be made that the decrease has ceased. In some embodiments, the block 1050 may be similar or comparable to the block 1015, but monitoring for a cessation of the persistently occurring decrease rather than the beginning of the persistently occurring decrease. For example, a controller may consider how far off from historical power generation levels the current power generation is located, how variable the data has been leading up to the higher power generation data, etc. As another example, the controller may consider a temporal duration of the increase towards typical power generation in the expected power generation, etc. and/or any other analysis on the sensor data. If the persistently occurring decrease has not ceased, the method 1000 may return to the block 1045 to continue to monitor whether the stowed orientation is to be changed from one stowed orientation to another. If the persistently occurring decrease has ceased, the method 1000 may proceed to the block 1055.

At block 1055, the solar power generating device may be returned to the tracked orientation. For example, based on the persistently occurring decrease in energy generation ceasing, the controller may return to typical tracking operations and the tracked orientation. The method 1000 may then return to the block 1005 to continue to monitor for additional persistently occurring decreases in expected energy generation.

At block 1060, based on a determination that there are not multiple potential stowed orientations at the block 1030, the orientation may be changed to the sole stowed orientation. In some embodiments, the stowed orientation may be horizontal (0 degrees from horizontal) or may be slightly off from horizontal (e.g., +/−5 degrees from horizontal) such that rain or snow may slide off of the solar power generating device while still being at an orientation that reduces wind forces and/or optimizes the aperture of the solar panel in a diffuse light condition.

At block 1065, a determination may be made whether the persistently occurring decrease has ceased. The block 1065 may be similar or comparable to the block 1050. If the persistently occurring decrease has not ceased, the method 1000 may return to the block 1065 to continue to monitor whether the persistently occurring decrease has ceased. If the persistently occurring decrease has ceased, the method 1000 may proceed to the block 1070.

At block 1070, the solar power generating device may be returned to the tracked orientation. The block 1070 may be similar or comparable to the block 1055. The method 1000 may then return to the block 1005 to continue to monitor for additional persistently occurring decreases in expected energy generation.

Modifications, additions, or omissions may be made to the method 1000 without departing from the scope of the disclosure. For example, the operations of the method 1000 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in a specific controller, implementation in software (stored on and/or executed by general purpose hardware) are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence of a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

What is claimed is:

1. A method, comprising:
    orienting one or more solar power units in a first position in which one or more rows of solar power units are shaded by one or more adjacent rows of solar power units;
    monitoring energy generated by the solar power units over a first window of time, the first window of time including from when the solar power units are oriented in the first position until a sun angle corresponds to none of the rows of solar power units being shaded by the adjacent rows of solar power units;
    identifying a knee in energy generation during the first window of time, the knee indicating a transition from a higher rate of change of energy generation to a lower rate of change of energy generation at a given solar angle; and
    plotting a trajectory of future orientation positions over time of the solar power units that include an orientation and time corresponding to the given solar angle.

2. The method of claim 1, further comprising rotating the solar power units to follow the trajectory of future orientation positions over time.

3. The method of claim 1, further comprising:
    identifying a set of candidate solar angles from multiple days based on candidate knees in the first window of time for each of the multiple days, the set of candidate solar angles including the given solar angle; and
    selecting the given solar angle as a flexion point based on a histogram of the candidate solar angles identifying the given solar angle as a most frequently occurring solar angle.

4. The method of claim 3, further comprising:
    detecting two peaks in the histogram of the candidate solar angles; and
    down-sampling the candidate solar angles prior to the identifying the given solar angle as the most frequently occurring solar angle.

5. The method of claim 1, further comprising:
    orienting the solar power units in a second position in which the rows of solar power units are in full sun;
    monitoring the energy generated by the solar power units over a second window of time, the second window of time including from when the solar power units are oriented in the second position until the sun angle corresponds to all of the rows of solar power units being shaded by one or more adjacent rows of solar power units; and
    identifying a second knee in energy generation during the second window of time, the second knee indicating a transition from a second lower rate of change of energy generation to a second higher rate of change of energy generation at a second given solar angle, wherein plotting the trajectory of future orientation positions over time includes both the orientation and time corresponding to the given solar angle and a second orientation and second time corresponding to the second given solar angle.

6. The method of claim 5, wherein the first window of time is before the sun angle is at a zenith and the second window of time is after the sun angle as at the zenith.

7. The method of claim 1, wherein the rows of solar power units are oriented and monitored in at least one additional position to identify at least one separate knee with separate given solar angles for each of the first position and the at least one additional position.

8. The method of claim 1, wherein plotting the trajectory of future orientation positions over time includes positioning a known curve of orientations such that the orientation and the time corresponding to the given solar angle is on the known curve.

9. The method of claim 1, wherein monitoring the energy generated by the solar power units over the first window of time comprises accumulating detected energy generation across multiple rows of the solar power units.

10. A system, comprising:
one or more solar power units, the solar power units including a first row of solar power units and a second row of solar power units adjacent to and generally parallel with the first row of solar power units;
a motor configured to change orientation of at least one row of the solar power units;
a sensor configured to monitor an amount of energy generated by the solar power units; and
a controller in communication with the motor and the sensor, the controller configured to perform operations, comprising:
orienting at least the first row of the solar power units in a first position in which the first row of solar power units is at least partially shaded by the second row of solar power units;
monitoring data from the sensor regarding energy generated by at least one of the solar power units over a first window of time, the first window of time including from when the first row of the solar power units is oriented in the first position until a sun angle corresponds to when the first row of the solar power units is out of shade cast by the second row of the solar power units;
identifying a knee in energy generation during the first window of time, the knee indicating a second transition from a higher rate of change of energy generation to a lower rate of change of energy generation at a given solar angle; and
plotting a trajectory of future orientation positions over time of the solar power units that include an orientation and time corresponding to the given solar angle.

11. The system of claim 10, wherein the motor controls orientation of the first row of solar power units and a second motor controls orientation of the second row of solar power units.

12. The system of claim 10, wherein the sensor monitors the amount of energy generated by the first row of solar power units and a second sensor monitors the amount of energy generated by the second row of solar power units.

13. The system of claim 10, wherein the operations further comprise rotating the solar power units to follow the trajectory of future orientation positions over time.

14. The system of claim 10, wherein the operations further comprise:
identifying a set of candidate solar angles from multiple days based on candidate knees in the first window of time for each of the multiple days, the set of candidate solar angles including the given solar angle; and
selecting the given solar angle as a flexion point based on a histogram of the candidate solar angles identifying the given solar angle as a most frequently occurring solar angle.

15. The system of claim 14, wherein the operations further comprise
detecting two peaks in the histogram of the candidate solar angles; and
down-sampling the candidate solar angles prior to the identifying the given solar angle as the most frequently occurring solar angle.

16. The system of claim 10, wherein the operations further comprise:
orienting the solar power units in a second position in which the rows of solar power units are in full sun;
monitoring the energy generated by the solar power units over a second window of time, the second window of time including from when the solar power units are oriented in the second position until the sun angle corresponds to all of the rows of solar power units being shaded by one or more adjacent rows of solar power units; and
identifying a second knee in energy generation during the second window of time, the second knee indicating a transition from a second lower rate of change of energy generation to a second higher rate of change of energy generation at a second given solar angle,
wherein plotting the trajectory of future orientation positions over time includes both the orientation and time corresponding to the given solar angle and a second orientation and second time corresponding to the second given solar angle.

17. The system of claim 16, wherein the first window of time is before the sun angle is at a zenith and the second window of time is after the sun angle as at the zenith.

18. The system of claim 10, wherein the rows of solar power units are oriented and monitored in at least one additional position to identify at least one separate knee with separate given solar angles for each of the first position and the at least one additional position.

19. The system of claim 10, wherein plotting the trajectory of future orientation positions over time includes positioning a known curve of orientations such that the orientation and the time corresponding to the given solar angle is on the known curve.

20. The system of claim 10, wherein monitoring the energy generated by the solar power units over the first window of time comprises accumulating detected energy generation across the first row of solar power units and additional rows of the solar power units.

* * * * *